(12) United States Patent
Jacobson et al.

(10) Patent No.: US 10,368,073 B2
(45) Date of Patent: Jul. 30, 2019

(54) MULTI-REGION SEARCH RANGE FOR BLOCK PREDICTION MODE FOR DISPLAY STREAM COMPRESSION (DSC)

(71) Applicant: QUALCOMM Incorporated, San Diego, CA (US)

(72) Inventors: Natan Haim Jacobson, San Diego, CA (US); Vijayaraghavan Thirumalai, San Diego, CA (US); Rajan Laxman Joshi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 263 days.

(21) Appl. No.: 15/369,723

(22) Filed: Dec. 5, 2016

(65) Prior Publication Data

US 2017/0163986 A1    Jun. 8, 2017

Related U.S. Application Data

(60) Provisional application No. 62/304,879, filed on Mar. 7, 2016, provisional application No. 62/264,087, filed on Dec. 7, 2015.

(51) Int. Cl.
*H04N 19/176* (2014.01)
*H04N 19/137* (2014.01)
(Continued)

(52) U.S. Cl.
CPC ......... *H04N 19/137* (2014.11); *H04N 19/105* (2014.11); *H04N 19/119* (2014.11);
(Continued)

(58) Field of Classification Search
CPC .................................................. H04N 19/137
See application file for complete search history.

(56) References Cited

U.S. PATENT DOCUMENTS 9,036,934 B2 * 5/2015 Kodama ............... H04N 19/90
  382/239
9,716,889 B2 * 7/2017 Ikeda .................. H04N 19/159
(Continued)

OTHER PUBLICATIONS

ITU-T H.265, Series H: Audiovisual and Multimedia Systems, Infrastructure of audiovisual services—Coding of moving video, Advanced video coding for generic audiovisual services, the International Telecommunication Union. Apr. 2015, 634 pp.
(Continued)

*Primary Examiner* — Jayanti K Patel
*Assistant Examiner* — Irfan Habib
(74) *Attorney, Agent, or Firm* — Shumaker & Sieffert, P.A.

(57) ABSTRACT

A method for coding a block of video data in simplified block prediction mode of a constant bitrate video coding scheme for transmission over display links is disclosed. In one aspect, the method includes determining a candidate block to be used to predict a current block in a current slice, the candidate block being within a range of pixel positions that each correspond to a reconstructed pixel in the current slice. The range of pixel positions may comprise (i) a first region including one or more first pixel positions in a first line of pixels that overlaps the current block, and (ii) a second region including one or more second pixel positions in a second line of pixels that does not overlap the current block. The method may further comprise determining and signaling a prediction vector indicative of a pixel position of the candidate block.

28 Claims, 28 Drawing Sheets

(51) Int. Cl.
*H04N 19/513* (2014.01)
*H04N 19/105* (2014.01)
*H04N 19/119* (2014.01)
*H04N 19/147* (2014.01)
*H04N 19/593* (2014.01)
*H04N 19/174* (2014.01)
*H04N 19/182* (2014.01)
*H04N 19/184* (2014.01)
*H04N 19/436* (2014.01)

(52) U.S. Cl.
CPC ......... *H04N 19/147* (2014.11); *H04N 19/176* (2014.11); *H04N 19/513* (2014.11); *H04N 19/593* (2014.11); *H04N 19/174* (2014.11); *H04N 19/182* (2014.11); *H04N 19/184* (2014.11); *H04N 19/436* (2014.11)

(56) References Cited

U.S. PATENT DOCUMENTS

| | | | | |
|---|---|---|---|---|
| 9,781,418 | B1* | 10/2017 | Maaninen | H04N 19/147 |
| 9,848,193 | B2* | 12/2017 | Thirumalai | H04N 19/124 |
| 9,866,853 | B2* | 1/2018 | Thirumalai | H04N 19/19 |
| 9,930,346 | B2* | 3/2018 | Thirumalai | H04N 19/115 |
| 10,091,533 | B2* | 10/2018 | Fuldseth | H04N 19/86 |
| 10,104,397 | B2* | 10/2018 | Hu | H04N 19/44 |
| 10,200,697 | B2* | 2/2019 | Ikizyan | H04N 19/186 |
| 2005/0013364 | A1* | 1/2005 | Hsu | H04N 19/533 375/240.16 |
| 2009/0052772 | A1* | 2/2009 | Speirs | G09G 3/2092 382/166 |
| 2009/0147855 | A1* | 6/2009 | Song | H04N 19/105 375/240.16 |
| 2010/0329345 | A1* | 12/2010 | Andersson | H04N 19/53 375/240.16 |
| 2011/0158315 | A1* | 6/2011 | Kim | H04N 19/124 375/240.03 |
| 2012/0166502 | A1* | 6/2012 | Chen | G06F 17/147 708/203 |
| 2012/0281150 | A1* | 11/2012 | Glen | H04N 21/43632 348/739 |
| 2013/0308057 | A1* | 11/2013 | Lu | H04N 19/152 348/656 |
| 2014/0092957 | A1* | 4/2014 | MacInnis | H04N 19/61 375/240.02 |
| 2014/0294089 | A1* | 10/2014 | MacInnis | H04N 19/63 375/240.19 |
| 2015/0271517 | A1* | 9/2015 | Pang | H04N 19/105 375/240.02 |
| 2015/0296210 | A1* | 10/2015 | Thirumalai | H04N 19/19 375/240.18 |
| 2015/0304675 | A1* | 10/2015 | Jacobson | H04N 19/50 375/240.12 |
| 2015/0341668 | A1* | 11/2015 | Lee | H04N 19/91 375/240.12 |
| 2015/0350674 | A1* | 12/2015 | Laroche | H04N 19/593 375/240.16 |
| 2016/0127771 | A1* | 5/2016 | Pasqualino | H04N 21/43635 348/474 |
| 2016/0301933 | A1* | 10/2016 | Jacobson | H04N 19/14 |
| 2016/0337661 | A1* | 11/2016 | Pang | H04N 19/105 |
| 2017/0025093 | A1* | 1/2017 | Ju | H04N 19/00 |
| 2017/0085886 | A1 | 3/2017 | Jacobson et al. | |
| 2017/0163986 | A1* | 6/2017 | Jacobson | H04N 19/137 |
| 2018/0302651 | A1* | 10/2018 | Jacobson | H04N 19/65 |

OTHER PUBLICATIONS

Response to Written Opinion dated Mar. 16, 2017, from International Application No. PCT/2016/065186, filed on Oct. 6, 2017, 22 pp.
International Preliminary Report on Patentability from International Application No. PCT/2016/065186, dated Feb. 2, 2018, 10 pp.
Second Written Opinion from International Application No. PCT/2016/065186, dated Oct. 31, 2017, 6 pp.
Bross, B., et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11, JCTVC-L1003_v34, 12th Meeting: Geneva, CH, Jan. 14-23, 2013, 310 pages.
Walls F., et al., "VESA Display Stream Compression", Video Electronics Standards Association (VESA), Mar. 3, 2014 (Mar. 3, 2014), pp. 1-5, XP002751573, Retrieved from the Internet: URL: http://www.vesa.org/wp-content/uploads/2014/04/VESA_DSC-ETP200.pdf on-Nov. 27, 2015].
International Search Report and Written Opinion—PCT/US2016/065186—ISA/EPO—dated Mar. 16, 2017.
VESA, "VESA Display Stream Compression (DSC) standard, version 1.1", No. VESA DSC v1.1, Aug. 1, 2014 (Aug. 1, 2014), XP008177054; 125 pages.

* cited by examiner

MULTI-REGION SEARCH RANGE FOR BLOCK PREDICTION MODE FOR DISPLAY STREAM COMPRESSION (DSC)

INCORPORATION BY REFERENCE TO PRIORITY APPLICATION(S)

This application claims the benefit of U.S. Provisional Application No. 62/264,087, filed Dec. 7, 2015, and U.S. Provisional Application No. 62/304,879, filed Mar. 7, 2016, each of which is hereby incorporated by reference under 37 CFR 1.57.

TECHNICAL FIELD

This disclosure relates to the field of video coding and compression, and particularly to video compression for transmission over display links, such as display link video compression.

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

There are coding schemes that involve image compression on the pixel data. However, such schemes are sometimes not visually lossless or can be difficult and expensive to implement in conventional display devices.

The Video Electronics Standards Association (VESA) has developed Display Stream Compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

Figure 1A:
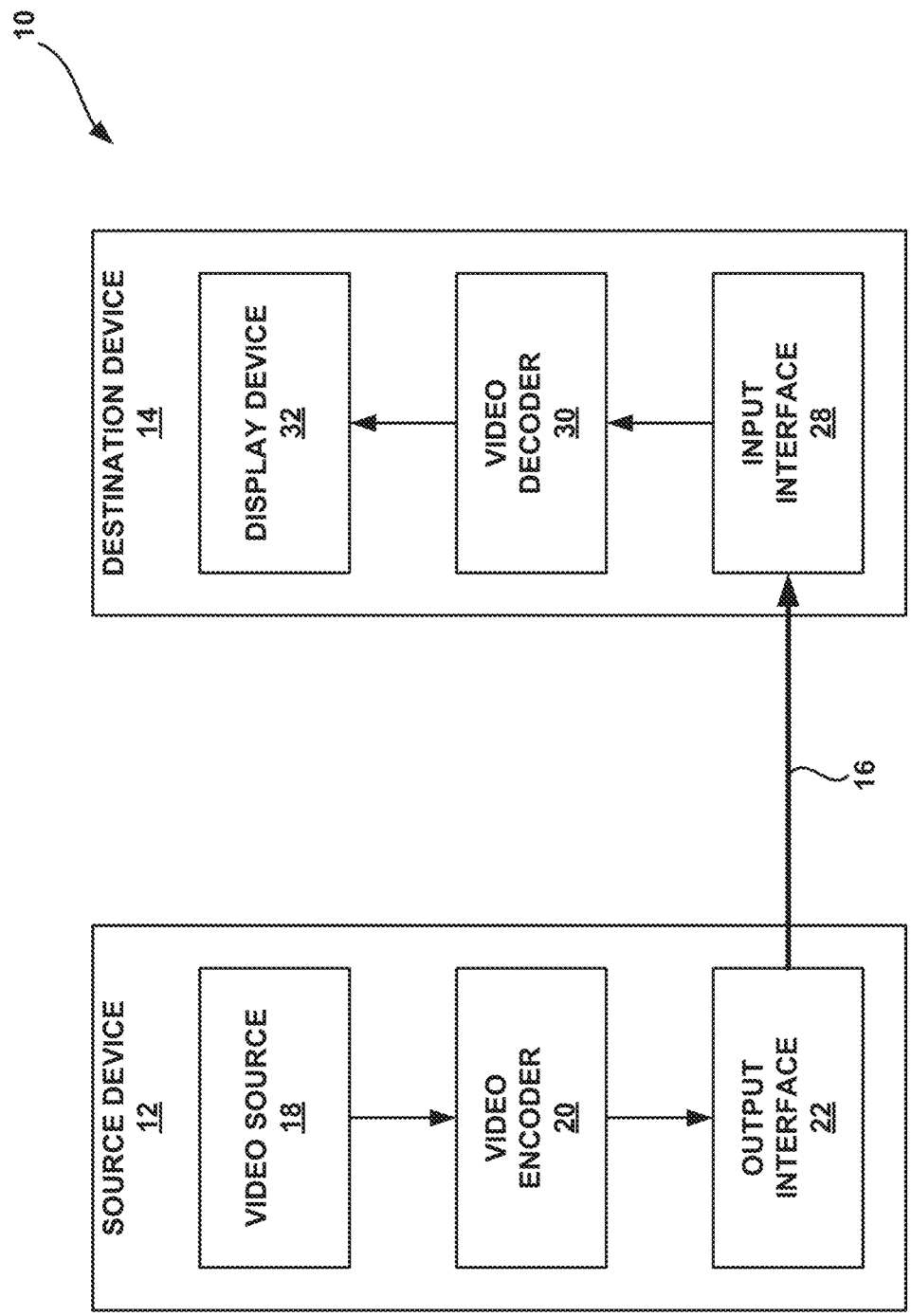
FIG. 1A is a block diagram illustrating an example video encoding and decoding system that may utilize techniques in accordance with aspects described in this disclosure.

The DSC standard includes a number of coding modes in which each block of video data may be encoded by an encoder and, similarly, decoded by a decoder. In some implementations, the encoder and/or the decoder may predict the current block to be coded based on a previously coded block.

However, the existing coding modes (e.g., transform coding, differential pulse-code modulation, etc.) do not provide a satisfactory way of compressing highly complex regions in video data. Often, for this type of data (i.e., highly compressed video data), the current block to be coded (or the current block's constituent sub-blocks) is similar in content to previous blocks that have been encountered by the coder (e.g., encoder or decoder). However, the existing intra prediction may be too limited to provide a satisfactory prediction of such a current block (e.g., prediction of the current block that is sufficiently similar to the current block and would thus yield a sufficiently small residual). Thus, an improved method of coding blocks of video data is desired.

The systems, methods, and devices of this disclosure each have several innovative aspects, no single one of which is solely responsible for the desirable attributes disclosed herein.

In one aspect, a method for coding a block of video data in simplified block prediction mode of a constant bitrate video coding scheme may include: determining a candidate block to be used to predict a current block in a current slice, the candidate block being within a range of pixel positions that each correspond to a reconstructed pixel in the current slice, the range of pixel positions comprising at least (i) a first region including one or more first pixel positions in a first line of pixels in the current slice, the first line of pixels including at least one pixel in the current block and spanning an entire width of the current slice, and (ii) a second region including one or more second pixel positions in a second line of pixels in the current slice, the second line of pixels not including any pixel in the current block but spanning the entire width of the current slice; determining a prediction vector indicative of a pixel position of the candidate block within the range of pixel positions, the pixel position of the candidate block being in one of the first region or the second region; and coding the current block in simplified block prediction mode at least in part via signaling the prediction vector.

In another aspect, an apparatus configured to code a block of video data in simplified block prediction mode of a constant bitrate video coding scheme may include: a memory configured to store one or more reconstructed pixels of a current slice of video data, and one or more processors in communication with the memory. The one or more processors may be configured to: determine a candidate block to be used to predict a current block in the current slice, the candidate block being within a range of pixel positions that each correspond to a reconstructed pixel in the current slice, the range of pixel positions comprising at least (i) a first region including one or more first pixel positions in a first line of pixels in the current slice, the first line of pixels including at least one pixel in the current block and spanning an entire width of the current slice, and (ii) a second region including one or more second pixel positions in a second line of pixels in the current slice, the second line of pixels not including any pixel in the current block but spanning the entire width of the current slice; determine a prediction vector indicative of a pixel position of the candidate block within the range of pixel positions, the pixel position of the candidate block being in one of the first region or the second region; and code the current block in simplified block prediction mode at least in part via signaling the prediction vector.

In another aspect, non-transitory physical computer storage may comprise code configured to code a block of video data in simplified block prediction mode of a constant bitrate video coding scheme. The code, when executed, may cause an apparatus to: determine a candidate block to be used to predict a current block in a current slice, the candidate block being within a range of pixel positions that each correspond to a reconstructed pixel in the current slice, the range of pixel positions comprising at least (i) a first region including one or more first pixel positions in a first line of pixels in the current slice, the first line of pixels including at least one pixel in the current block and spanning an entire width of the current slice, and (ii) a second region including one or more second pixel positions in a second line of pixels in the current slice, the second line of pixels not including any pixel in the current block but spanning the entire width of the current slice; determine a prediction vector indicative of a pixel position of the candidate block within the range of pixel positions, the pixel position of the candidate block being in one of the first region or the second region; and code the current block in simplified block prediction mode at least in part via signaling the prediction vector.

In another aspect, a video coding device may be configured to code a block of video data in simplified block prediction mode of a constant bitrate video coding scheme. The video coding device may comprise: means for determining a candidate block to be used to predict a current block in a current slice, the candidate block being within a range of pixel positions that each correspond to a reconstructed pixel in the current slice, the range of pixel positions comprising at least (i) a first region including one or more first pixel positions in a first line of pixels in the current slice, the first line of pixels including at least one pixel in the current block and spanning an entire width of the current slice, and (ii) a second region including one or more second pixel positions in a second line of pixels in the current slice, the second line of pixels not including any pixel in the current block but spanning the entire width of the current slice; means for determining a prediction vector indicative of a pixel position of the candidate block within the range of pixel positions, the pixel position of the candidate block being in one of the first region or the second region; and means for coding the current block in simplified block prediction mode at least in part via signaling the prediction vector.

DETAILED DESCRIPTION

In general, this disclosure relates to methods of improving video compression techniques, such as those utilized in display link video compression, for example. More specifically, the present disclosure relates to systems and methods for coding a block of video data in block prediction mode using adaptive search range selection.

While certain embodiments are described herein in the context of the DSC standard, which is an example of a display link video compression technique, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. Also, the techniques described in this disclosure may become part of standards developed in the future. In other words, the techniques described in this disclosure may be applicable to previously developed video coding standards, video coding standards currently under development, and forthcoming video coding standards.

The DSC standard includes a number of coding modes in which each block of video data may be encoded by an encoder and, similarly, decoded by a decoder. In some implementations, the encoder and/or the decoder may predict the current block to be coded based on a previously coded block.

However, the existing coding modes (e.g., transform coding, differential pulse-code modulation, etc.) do not provide a satisfactory way of compressing highly complex regions in video data. Often, for this type of data (i.e., highly compressed video data), the current block to be coded (or the current block's constituent sub-blocks) is similar in content to previous blocks that have been encountered by the coder (e.g., encoder or decoder). However, the existing intra prediction may be too limited to provide a satisfactory prediction of such a current block (e.g., prediction of the current block that is sufficiently similar to the current block and would thus yield a sufficiently small residual). Thus, an improved method of coding blocks of video data is desired.

In the present disclosure, an improved method of coding a block in block prediction mode is described. For example, when searching for a candidate block (or a candidate region) to be used to predict the current block (or a current region within the current block), a search range may be defined such that the encoder has access to potential candidates that may be a good match while minimizing the search cost. In another example, the encoder may determine which one of multiple search ranges to use for coding the current block based on a rate distortion (RD) analysis. In yet another example, the encoder may determine which ones of the previously coded pixels are to be included in the search range used for coding the current block based on a variety of factors such as the location of the current block, RD cost, etc. By performing more operations (e.g., searching for a candidate block to be used for predicting the current block, calculating a vector identifying the location of the candidate block with respect to the current block, comparing costs associated with using different search ranges, etc., which may consume computing resources and processing power) on the encoder side, the method may reduce decoder complexity. Additionally, by allowing multiple and/or adaptive search ranges to be used for coding a block in block prediction mode, the likelihood of locating superior candidate partitions may be increased, thereby improving the coding efficiency and/or coding performance of the block prediction mode. Further, by allowing the encoder to adaptively select the search range to be used for coding each block, the performance of the block prediction scheme may further be improved.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
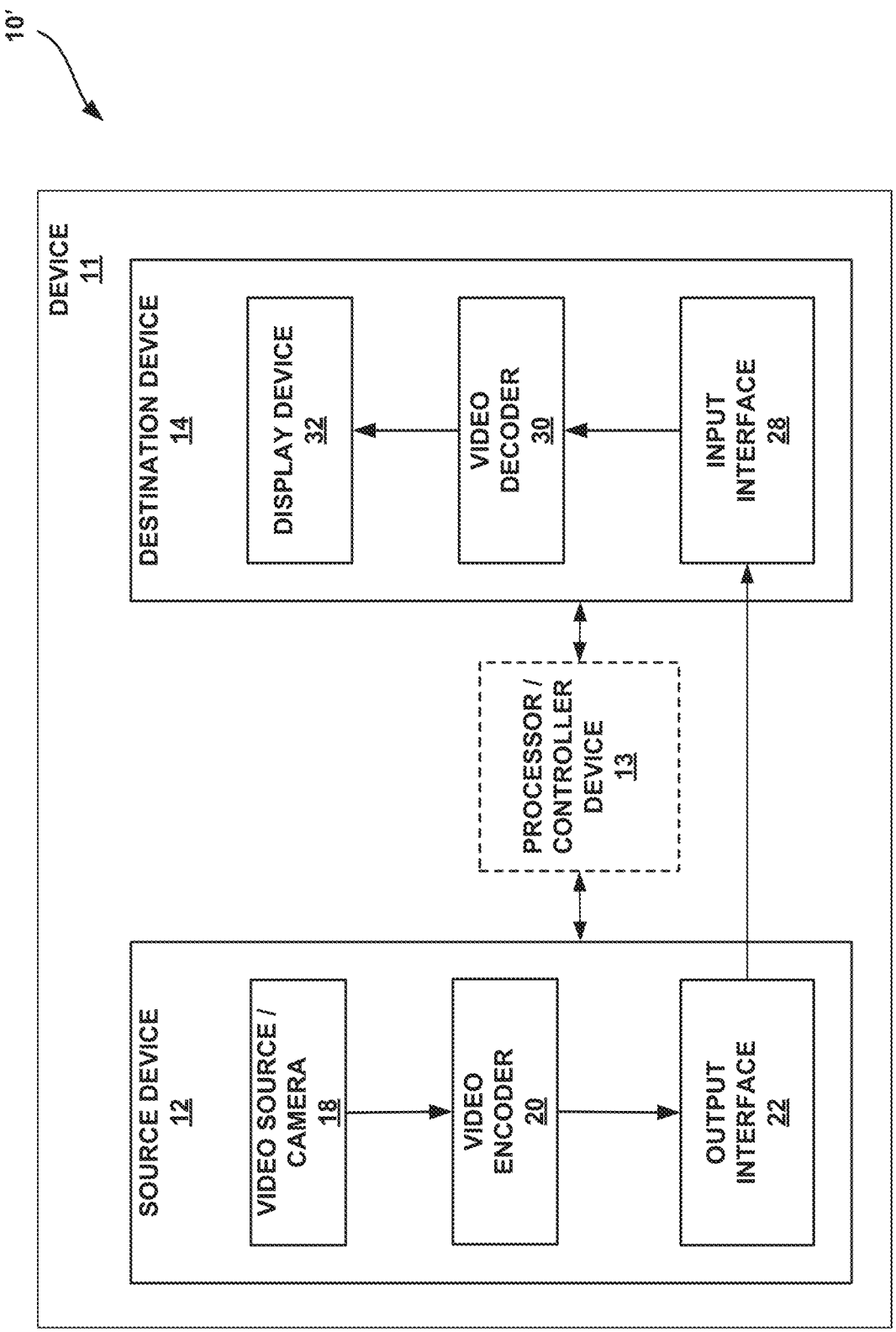
FIG. 1B is a block diagram illustrating another example video encoding and decoding system that may perform techniques in accordance with aspects described in this disclosure.

As shown in FIG. 1A, video coding system 10 includes a source device 12 (i.e., "video coding device 12" or "coding device 12") that generates encoded video data to be decoded at a later time by a destination device 14 (i.e., "video coding device 14" or "coding device 14"). In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices (also referred to as video coding devices) including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for (i.e., configured to communicate via) wireless communication.

The video coding devices 12, 14 of the video coding system 10 may be configured to communicate via wireless networks and radio technologies, such as wireless wide area network (WWAN) (e.g., cellular) and/or wireless local area network (WLAN) carriers. The terms "network" and "system" are often used interchangeably. Each of the video coding devices 12, 14 may be a user equipment (UE), a wireless device, a terminal, a mobile station, a subscriber unit, etc.

The WWAN carriers may include, for example, wireless communication networks such as Code Division Multiple Access (CDMA), Time Division Multiple Access (TDMA), Frequency Division Multiple Access (FDMA), Orthogonal FDMA (OFDMA), Single-Carrier FDMA (SC-FDMA) and other networks. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2).

The video coding devices 12, 14 of the video coding system 10 may also communicate with each over via a WLAN base station according to one or more standards, such as the IEEE 802.11 standard, including, for example these amendments: 802.11a-1999 (commonly called "802.11a"), 802.11b-1999 (commonly called "802.11b"), 802.11g-2003 (commonly called "802.11g"), and so on.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, a video encoder 20 (also referred to as simply encoder 20) and an output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30 (also referred to as simply decoder 30), and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data (e.g., video coding layer (VCL) data and/or non-VCL data), the video encoder 20 may generate a bitstream. The bitstream may include a sequence of bits that form a coded representation of the video data. The bitstream may include coded pictures and associated data. A coded picture is a coded representation of a picture. VCL data may include coded picture data (i.e., information associated with samples of a coded picture(s)) and non-VCL data may include control information (e.g., parameter sets and/or supplemental enhancement information) associated with the one or more coded pictures.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired RD performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the number of bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
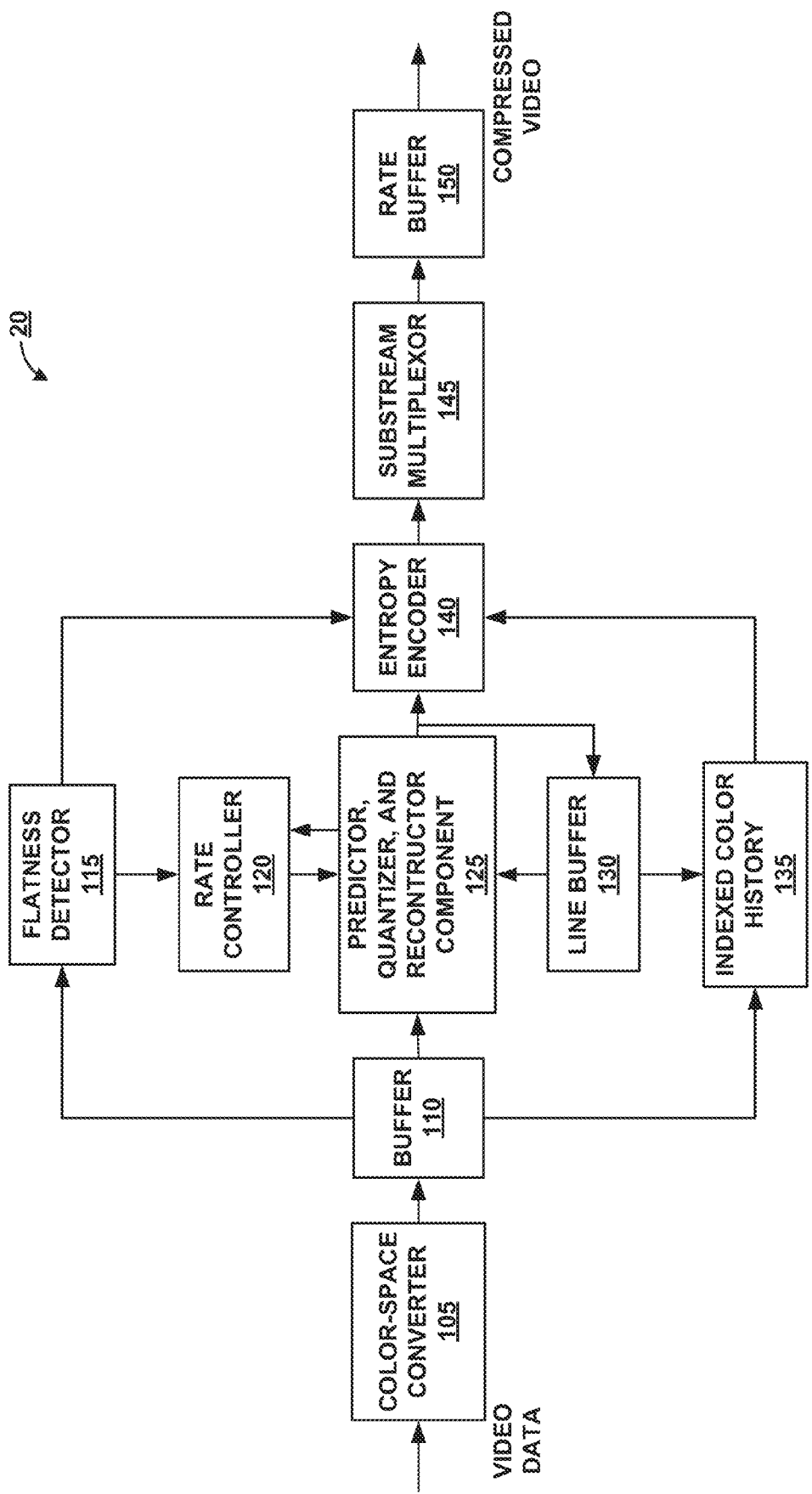
FIG. 2A is a block diagram illustrating an example of a video encoder that may implement techniques.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold (e.g., store) the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The number of bits spent on encoding each block can vary highly substantially based on the nature of the block. The rate buffer 150 can smooth the rate variations in the compressed video. In some embodiments, a constant bit rate (CBR) buffer model is employed in which bits stored in the rate buffer (e.g., the rate buffer 150) are removed from the rate buffer at a constant bit rate. In the CBR buffer model, if the video encoder 20 adds too many bits to the bitstream, the rate buffer 150 may overflow. On the other hand, the video encoder 20 may need to add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

BF=((BufferCurrentSize*100)/BufferMaxSize)

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal RD performance. The rate controller 120 minimizes the distortion of the reconstructed images such that the rate controller 120 satisfies the bit-rate constraint, i.e., the overall actual coding rate fits within the target bit rate.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample. As further discussed below with reference to FIGS. 3-26, the predictor, quantizer, and reconstructor component 125 may be configured to code (e.g., encode or decode) the block of video data (or any other unit of prediction) based on one or more techniques described herein. For example, the predictor, quantizer, and reconstructor component 125 may be configured to perform the methods illustrated in FIGS. 3-26. In other embodiments, the predictor, quantizer, and reconstructor component 125 may be configured to perform one or more methods or techniques described herein with one or more other components of the video encoder 20.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds (e.g., stores) the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
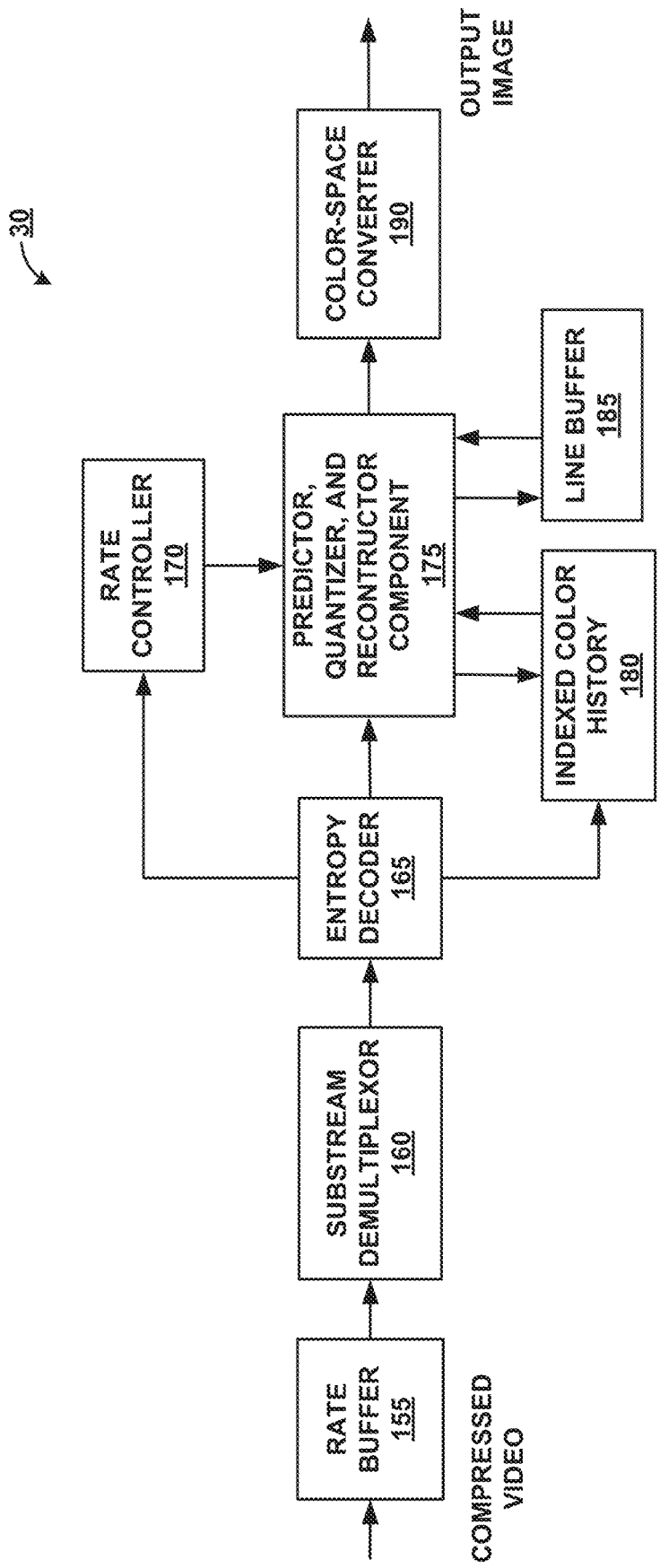
FIG. 2B is a block diagram illustrating an example of a video decoder that may implement techniques.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above. In some embodiments, one or more components of the video encoder 20 and/or video decoder 30 may be implemented by one or more hardware processors configured to execute software code configured to perform the tasks of such components. In other embodiments, one or more components of the video encoder 20 and/or the video decoder 30 may be implemented by hardware circuitry configured to perform the tasks of such components.

Slices in DSC

As noted above, a slice generally refers to a spatially distinct region in an image or a frame that can be decoded independently without using the information from the rest of the regions in the image or frame. Each image or video frame may be encoded in a single slice or it may be encoded in several slices. In DSC, the target bits allocated to encode each slice may be substantially constant.

Block Prediction Mode

A single block of video data may contain a number of pixels, and each block of video data has a number of potential coding modes in which the block can be coded. One of such coding modes is block prediction mode. In block prediction mode, the coder attempts to find a candidate block in the previous reconstructed line (e.g., if the current block is not in the first line of the current slice) or previous reconstructed blocks in the same line (e.g., if the current block is in the first line of the current slice) that is close (e.g., in pixel values) to the current block to be coded. In some embodiments, closeness between pixel values is determined by the Sum of Absolute Differences (SAD) metric. The coder may attempt to find the candidate block in any portion of the previously reconstructed blocks defined by a search range (e.g., which may be a predetermined value known to both the encoder and the decoder). The search range is defined such that the encoder has potential candidates within the search range to find a good match while minimizing the search cost. The coding efficiency of block prediction mode comes from the fact that, if a good candidate (i.e., a candidate within the search range that is determined to be close in pixel values to the current block to be coded) is discovered, the difference (known as the residual) between the candidate block and the current block will be small. The small residual will take a fewer number of bits to signal compared to the number of bits needed to signal the actual pixel values of the current block, thereby resulting in a lower RD cost and increasing the likelihood of being selected by the RD mechanism. The performance boost from enabling block prediction mode is extremely significant for certain types of graphics content.

Parameters in Block Prediction Mode

The block prediction mode is designed to produce a candidate block, given a specified search range, that provides the minimum distortion from the current block to be encoded. In some embodiments, minimum distortion is defined using SAD. In some implementations of the present disclosure, the block prediction method is defined by three parameters: search range (SR), skew ($\alpha$), and partition size ($\beta$). These three parameters affect the performance of the block prediction mode, and may be tuned (i.e., modified or reconfigured) during implementation. These parameters may be known to both the encoder and the decoder.

Search Space in Block Prediction Mode

Figure 3:
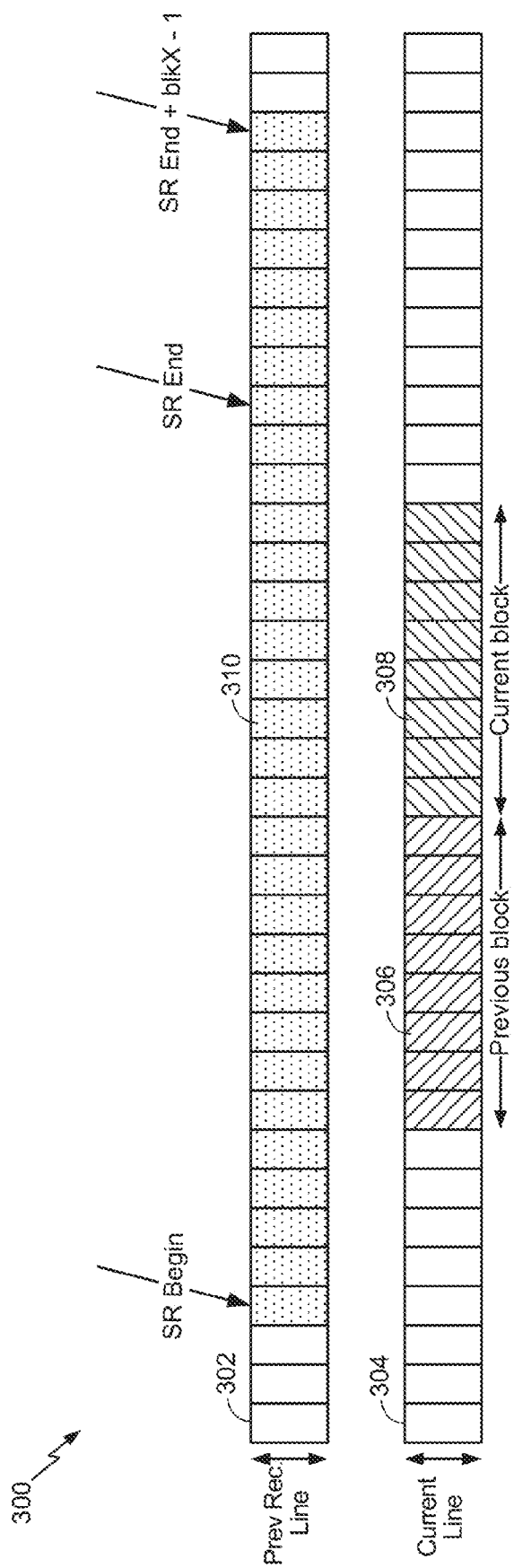
FIG. 3 is a block diagram illustrating the search space for a non-first line for a 1-D block.
Figure 4:
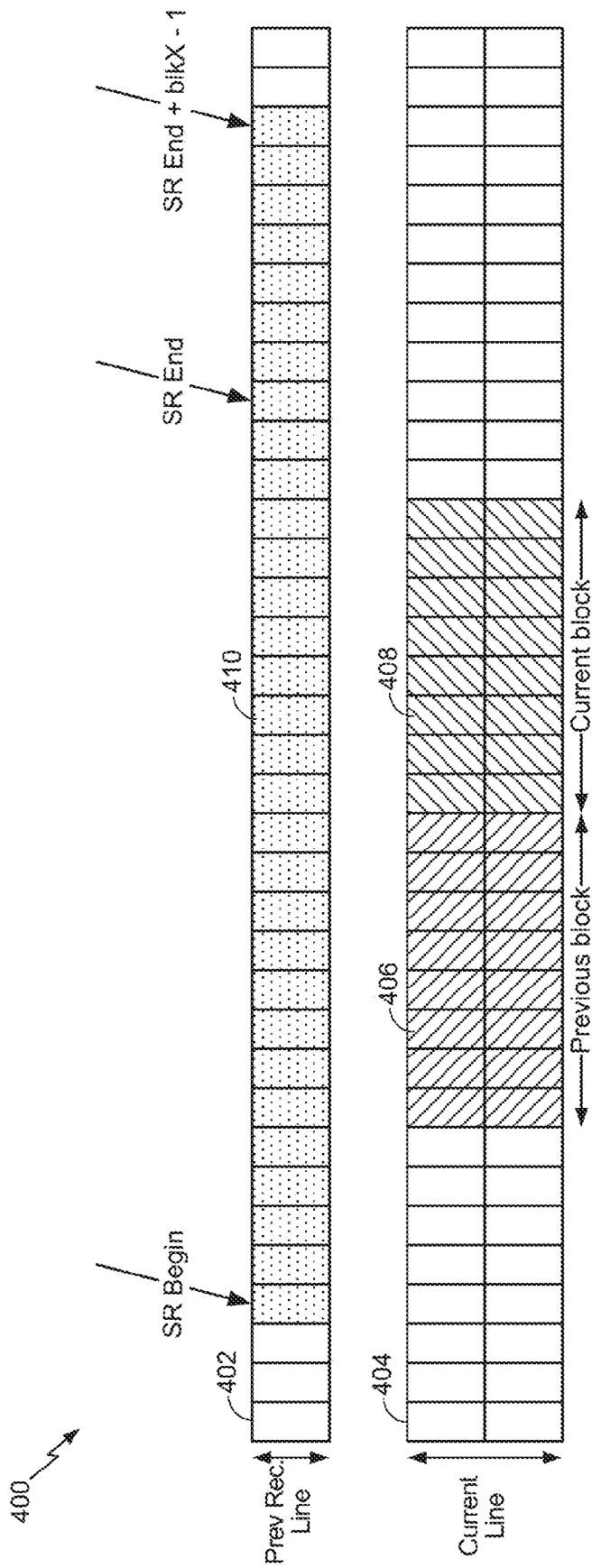
FIG. 4 is a block diagram illustrating the search space for a non-first line for a 2-D block.
Figure 5:
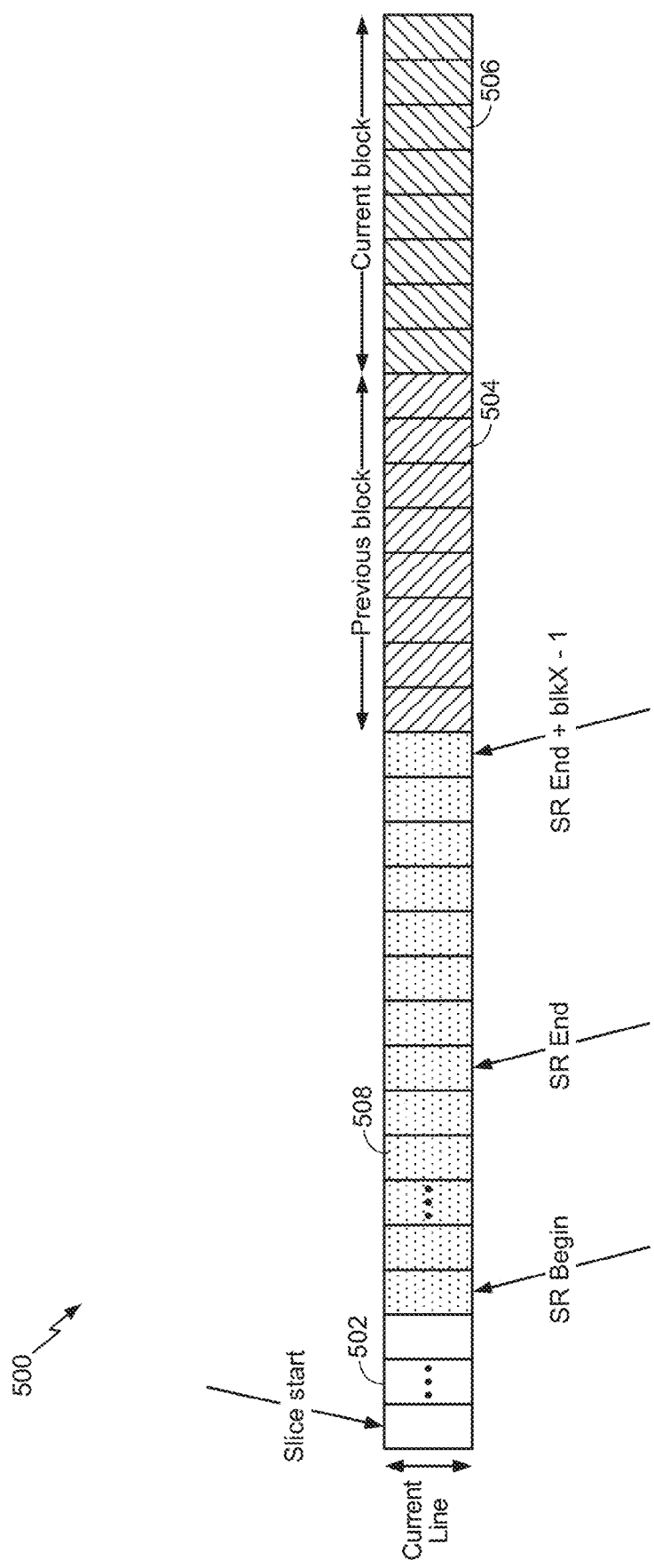
FIG. 5 is a block diagram illustrating the search space for a first line for a 1-D block.
Figure 6:
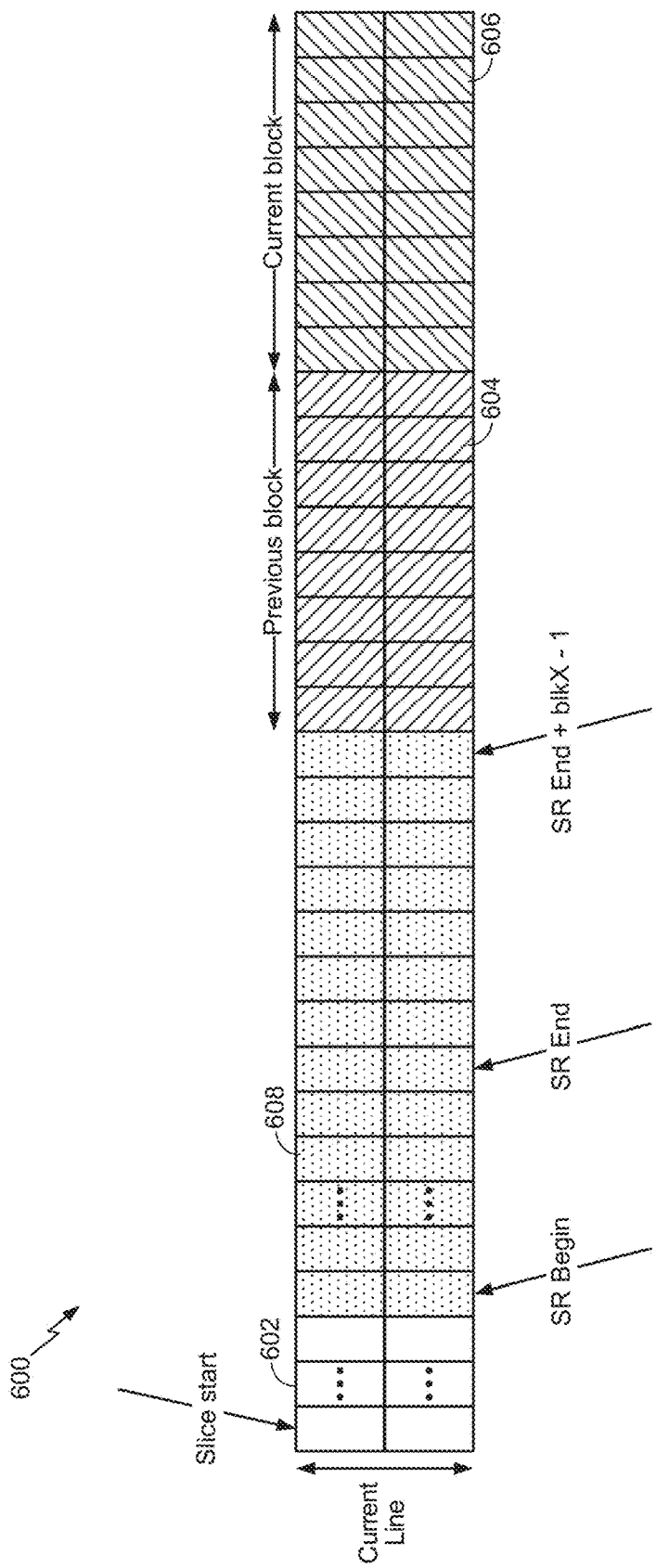
FIG. 6 is a block diagram illustrating the search space for a first line for a 2-D block.

In some embodiments of the present disclosure, the search space (e.g., spatial locations of pixels that the encoder may search in order to find a candidate block) may differ based on the characteristics of the current block. The search space may encompass all previously reconstructed blocks/pixels, but the encoder and/or the decoder may limit the search for a candidate block to a specified portion (e.g., a "search range" defined by one or more parameters that are either predefined or signaled in the bitstream) within the search space, for example, to reduce computational complexity. Examples of the block prediction search space are illustrated in FIGS. 3-6. FIGS. 3 and 4 illustrate cases involving a current block (e.g., current blocks 308 and 408) that is not in the first line of the current slice. FIGS. 5 and 6 illustrate cases involving a current block (e.g., current blocks 506 and 606) that is in the first line of the current slice. These two cases are handled separately because the first line in a slice has no vertical neighbors. Therefore, the reconstructed pixels from the current line can be leveraged as a search range (e.g., search ranges 508 and 608). In the present disclosure, the first line in the current slice may be referred to as an FLS and any other line in the current slice may be referred to as an NFLS.

Further, the block prediction techniques described herein may be implemented in either a codec using a single line buffer (i.e., 1-D block size) or a codec using multiple line buffers (i.e., 2-D block size). Examples of the search space for the 1-D case are shown in FIGS. 3 and 5, and examples of the search space for the 2-D case are shown in FIGS. 4 and 6. In the 2-D case, the search range may include pixels from the previous reconstructed line (e.g., previous line 402) or reconstructed blocks from the same lines as those in the 2-D block (e.g., previous 604 in the current line 602, which is immediately to the left of the current block 606). The 2-D block may be partitioned either horizontally or vertically or both. In the case involving block partitions, a block prediction vector may be specified for each block partition.

Example Implementations of Block Prediction Mode

In some embodiments of the present disclosure, a distortion metric other than SAD may be used, e.g. sum of squared differences (SSD). Alternately or additionally, the distortion may be modified by weighting. For example, if the YCoCg color space is being used, then the cost may be calculated as:

$$SAD(Y) + \frac{SAD(Co) + SAD(Cg)}{2}$$

The block prediction techniques described herein may be performed either in the RGB or YCoCg color space. In addition, an alternative implementation may use both color spaces and signal a 1-bit flag to the decoder indicating which of the two color spaces is selected (e.g., whichever color space that has the lowest cost in terms of rate and distortion).

In some embodiments of the present disclosure concerning FLS, the direct previous reconstructed block or blocks may be excluded from the search range due to pipelining and timing constraints. For example, depending on the hardware implementation, the coder may not have completed the processing of the direct previous reconstructed block by the time the current block is processed by the coder (e.g., the reconstructed pixels for the previous block may not be known when the coder begins processing the current block), resulting in delays or failures. In such an implementation, by restricting the use of previous reconstructed blocks to those blocks for which reconstructed pixel values are known (e.g., by excluding the direct previous reconstructed block or blocks), the pipelining concerns illustrated above may be resolved. In some embodiments of the present disclosure concerning NFLS, the search range to the left of the current block may be from the same line rather than the previous reconstructed line. In some of such embodiments, one or more previous reconstructed blocks may be excluded from the search range due to pipelining and timing constraints.

Example Implementation of NFLS

As shown in FIG. 3, the block prediction method may search through the search range 310 (SR) in the search space to find a candidate for the current block 308 (and similarly in the search space 400 of FIG. 4). If the x-coordinate position of the first pixel of the current block 308 to be encoded is j, then the set of starting positions k of all candidate blocks within the search space may be given as:

$$k \in [j-SR+(\alpha+1), j+\alpha]$$

In this example, the parameter a skews the x-coordinate position of the search range 310 relative to the current block to be encoded. A higher value of α shifts the search range 310 to the right, while a lower value of α shifts the search range 310 to the left. For example, (i) SR of 32 and α of 15 may place the search range 310 in the center of the previous line 302, (ii) SR of 32 and α of 0 may place the search range 310 on the left side of the previous line 302, and (iii) SR of 32 and α of 31 may place the search range 310 on the right side of the previous line 302.

In some implementations of the present disclosure, a pixel that is within the search range but outside of the slice boundary may be set to half the dynamic range for that pixel. For example, if the content is RGB888, then the default value of 128 may be used for R, G, and B. If the content is in the YCoCg space, then a default value of 128 may be used for Y, and a default value of 0 may be used for Co and Cg (e.g., Co and Cg are 9-bit values that are centered around 0).

Example Implementation of FLS

As shown in FIG. 5, the search range may be different for the FLS case. This is because vertical neighbors are not available because such vertical neighbors are outside of the current frame, or because such vertical neighbors are contained within a different slice. In some embodiments of the present disclosure concerning the FLS case, pixels in the current line may be used for block prediction. In one embodiment, any pixel in the current line to the left of the current block may be considered as part of the search range. In another embodiment, one or more previously coded blocks (e.g., the previous block 504 that is immediately to the left of the current block) may be excluded from the search range due to pipelining and timing constraints.

In some implementations of FLS, the available range for the first few blocks in the first line of the slice may be less than the search range that is typically expected for other blocks. This is because the valid position for candidate blocks starts at the beginning of the line and ends before the current block. For the first few blocks in the FLS, this valid range may be smaller than the desired range (e.g., 32 or 64 positions). Thus, for these blocks, the search range may need to be adjusted such that each block partition of the candidate block is fully contained within the search range. For NFLS, the search range may be shifted left or right such that the total number of search positions is equal to the defined search range (e.g., 32 or 64 pixel positions). Since j is the first pixel in the current block, the last pixel in the current block will be j+blkWidth−1. For this reason, the search range may need to be shifted (blkWidth−1) pixels to the left.

In some implementations of FLS, if the x-coordinate location of the first pixel of the current block to be encoded is referred to as j, then the set of starting positions of all candidate blocks within the search range is given as:

(i) if most recent previous reconstructed block is part of the search range, e.g., α=−1:

$$k \in [j-SR-(blkWidth-1), j-1-(blkWidth-1)]$$

(ii) if n most recent previous reconstructed blocks are to be excluded from the search range:

$$k \in [j-(n \cdot blk_x+SR)-(blkWidth-1), j-(n \cdot blk_x+1)-(blkWidth-1)]$$

where $blk_x$ is the block width. Any pixel outside of the slice boundary may be set to a default value as described above in connection with the NFLS case. It should also be noted that no skew parameter need be associated with the FLS case.

Example Flowchart for Coding in Block Prediction Mode

Figure 7:
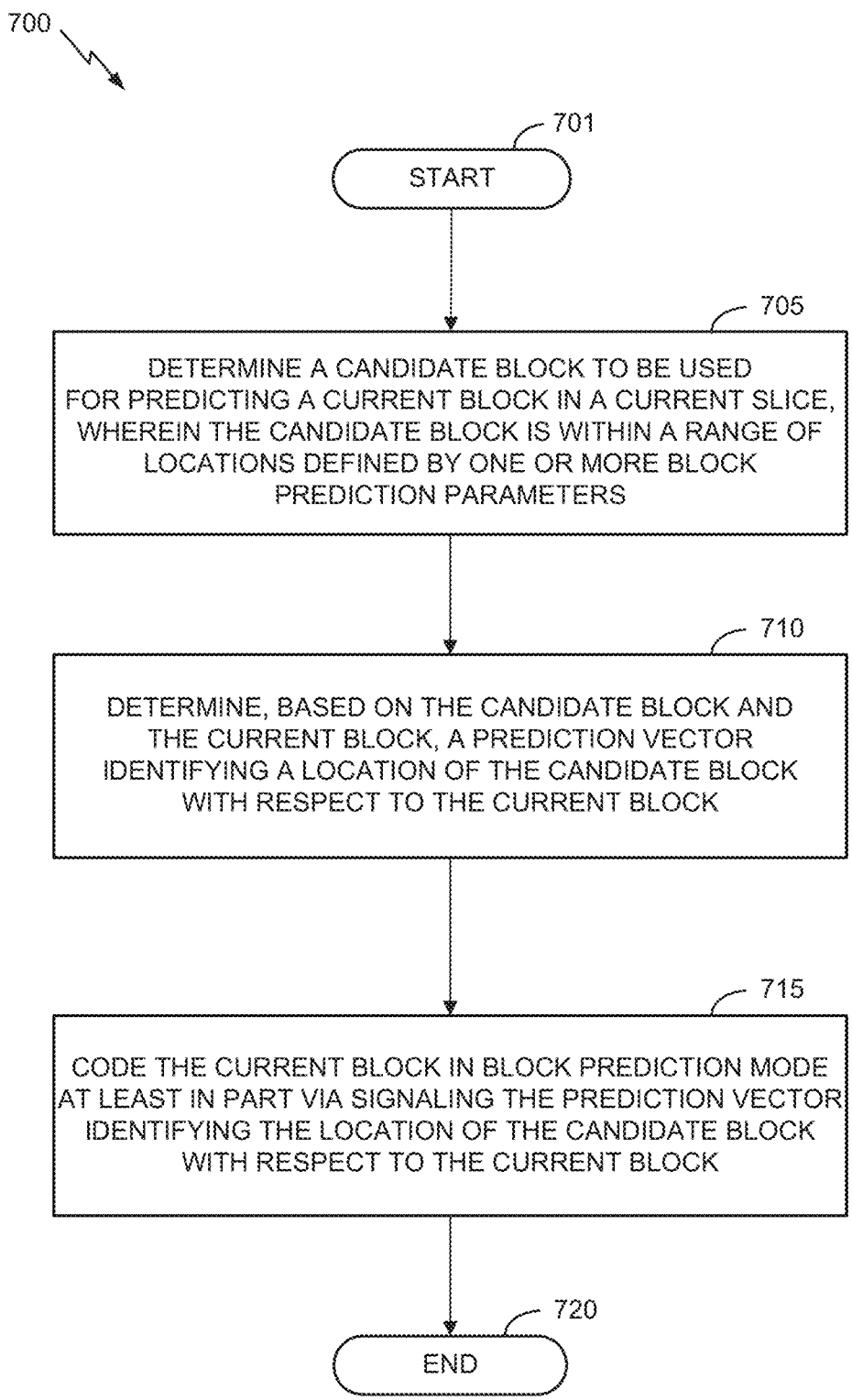
FIG. 7 is a flowchart illustrating a method for predicting a block of video data in block prediction mode.

With reference to FIG. 7, an example procedure for coding a block of video data in block prediction mode will be described. The steps illustrated in FIG. 7 may be performed by a video encoder (e.g., the video encoder 20 in FIG. 2A), a video decoder (e.g., the video decoder 30 in FIG. 2B), or component(s) thereof. For convenience, method 700 is described as performed by a video coder (also simply referred to as coder), which may be the video encoder 20, the video decoder 30, or another component.

The method 700 begins at block 701. At block 705, the coder determines a candidate block to be used for predicting a current block in a current slice. The candidate block may be within a range of locations (or pixel positions) defined by one or more block prediction parameters. For example, the block prediction parameters may include (i) a search range parameter defining the size of the range of locations, (ii) a skew parameter defining the relative location of the range of locations with respect to the current block, and (iii) a partition size parameter defining the size of each partition in the current block. In some embodiments of the present disclosure, each of the search range parameter, the skew parameter, and the partition size parameter spatially, rather than temporally, define the locations of the candidate block. At block 710, the coder determines a prediction vector based on the candidate block and the current block. The prediction vector may identify the location of the candidate block with respect to the current block. The prediction vector may include one or more coordinate values (e.g., a coordinate value indicating the offset in the 1-D space). At block 715, the coder codes the current block in block prediction mode at least in part via signaling the prediction vector. In some embodiments, the coder may also signal the residual between the candidate block and the current block. Bit savings may be achieved by signaling the prediction vector identifying the location of the candidate block and the residual representing the difference between the current block and the candidate block, instead of having to signal the actual pixel values of the current block. The method 700 ends at block 720.

In the method 700, one or more of the blocks shown in FIG. 7 may be removed (e.g., not performed) and/or the order in which the method is performed may be switched. In some embodiments, additional blocks may be added to the method 700. The embodiments of the present disclosure are not limited to or by the example shown in FIG. 7, and other variations may be implemented without departing from the spirit of this disclosure.

After Finding Candidate Block

After the best candidate block has been determined, the pixel values of the candidate block are subtracted from the pixel values of the current block, resulting in the residual. The residual may be quantized based on a pre-selected QP associated with the block prediction mode. The quantized residual may be encoded using a codebook (which can be either fixed-length or variable-length) and signaled using a fixed-length code or a variable-length code. The selected codebook may be based on the coding efficiency and hardware complexity requirements. For example, the selected codebook may be an Exp-Golomb codebook. In some embodiments of the present disclosure, an entropy coding scheme that is similar to the delta size unit variable length coding (DSU-VLC) of existing DSC implementations may be used. In some embodiments, the residual may be transformed (e.g., using a direct cosine transform, a Hadamard transform, or other known transforms) before the quantization described above.

In some embodiments of the present disclosure, the samples in the residual of the current block may be partitioned into multiple groups (e.g., 4 samples per group for a block that contains 16 samples). If all the coefficients in the block are zero, then the residual of the block is coded using skip mode, i.e., 1-bit flag per block (per component) is signaled to indicate if the current component in the block is coded using skip mode or not. If at least one non-zero value is contained within the block, each group may be coded using DSU-VLC only if the group has one non-zero value. If the group (e.g., 4 samples of the 16 samples in the residual) does not contain any non-zero values, the group is coded using skip mode, i.e., 1-bit flag per group is signaled to indicate if the group is coded using skip mode or not. More specifically, for each group, a search may be performed to determine whether all the values in the group are zero. If all the values in the group are zero, a value of '1' may be signaled to the decoder; otherwise (if at least one value is non-zero), a value of '0' may be signaled to the decoder, followed by the coding of the DSU-VLC coding. In an alternative example, a value of '0' may be signaled if all the values in the group are zero and a value of '1' may be signaled if the group contains at least one non-zero value.

In some embodiments of the present disclosure, the best candidate block is signaled explicitly to the decoder by transmitting a fixed-length code containing the best offset. The offset may be referred to as a "vector". The advantage of signaling the vector explicitly to the decoder is that the decoder will not have to perform the block search itself. Rather, the decoder will receive the vector explicitly and add the candidate block to the decoded, de-quantized residual values to determine the pixel values of the current block.

Block Partitioning

In some embodiments of the present disclosure, the current block to be coded may be partitioned, resulting in multiple candidate blocks and multiple vectors per block. In some of such embodiments, the vector(s) may be explicitly signaled using a fixed-length code. For example, the length of this fixed-length code may be $\log_2(SR)$. In another embodiment, the vector(s) may be explicitly signaled using a variable-length code, such as a code from the Exponential-Golomb or Golomb-Rice code families. This codebook could be selected based on the statistical distribution associated with vector(s). In yet another embodiment, the vector(s) may be predicted based on the previously-coded vector(s), and the residual of the vector(s) may be coded using some fixed-length or variable-length code. In yet another embodiment, the vector(s) may be predicted based on the previously-coded vector(s), and a 1-bit flag may be used to signal whether the two vectors are identical. This flag may be referred to as SameFlag. If SameFlag=1, then the vector value itself need not be signaled to the decoder. If SameFlag=0, then the vector will be signaled explicitly (e.g., using either a fixed-length or variable-length code). An example block partitioning scheme is illustrated in FIG. 8.

Figure 8:
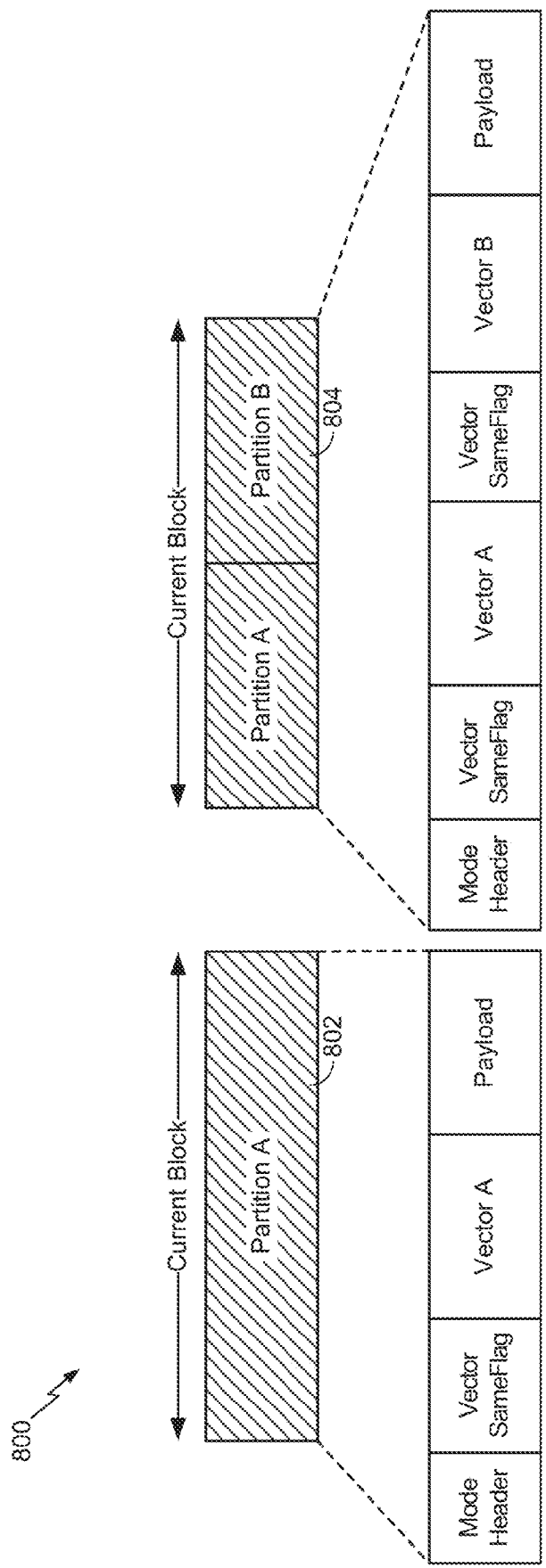
FIG. 8 is a block diagram illustrating a block having partitions.

As shown in diagram 800 of FIG. 8, a current block 802 contains a single partition. The information signaled for the current block 802 comprises a mode header, a vector SameFlag, a vector A, and a payload. A current block 804 contains two partitions, partition A and partition B. The information signaled for the current block 804 comprises a mode header, a vector SameFlag, a vector A, a vector SameFlag, a vector B, and a payload. As described above, one or more items listed above may not be signaled. For example, if the vector SameFlag is equal to 1, the following vector need not be signaled.

The partition size β may determine the partitioning of the current block into separate sub-blocks. In such a case, a separate block prediction may be performed for each sub-block. For example, if the block size is N=16 and partition size β=8β=8, then the search will be performed for each of the 16/8=2 partitions. In another example, if β=N, block partitioning is disabled. If β<N, then each vector may be signaled explicitly to the decoder. If vector prediction (e.g., using previously signaled vectors to define the current vectors) is not employed, then each vector will be signaled using a fixed-length or variable-length code. If vector prediction is employed, the first vector may be predicted from the previous coded vector (e.g., stored in memory) and for n>0, vector n is predicted from vector n−1.

Variable Partition Size in Block Prediction Mode

The examples above illustrate how blocks having a size of 1×8 (e.g., having a height of 1 pixel and a width of 8 pixels) or 2×8 (e.g., having a height of 2 pixels and a width of 8 pixels) may be coded in block prediction mode. As shown in FIG. 8, a block may be partitioned into multiple regions and each region can be coded using different partitioning schemes (e.g., using 1×2 partitions, using 2×2 partitions, etc.), and a block prediction vector may be specified for each partition (e.g., signaled in the bitstream along with the residual associated with each partition). For example, each block may be partitioned into multiple 1×2 partitions containing two pixels (or partitions of other fixed sizes).

In other embodiments, the encoder may determine the block partition size that is most efficient for each block (for each sub-region within the block). The efficiency may be measured based on the rate and distortion associated with coding the block (or a sub-region therein) using the given block partition size. For example, when coding a block containing four 2×2 regions, the encoder may determine that the greatest coding efficiency can be achieved by coding the first three 2×2 regions using single partitions (e.g., a single 2×2 partition for each 2×2 region) and coding the fourth 2×2 region using two partitions (e.g., two 1×2 partitions). By allowing the encoder to adaptively select the partition size for each block, the performance of the block prediction scheme can be further improved. This is because large partitions can be used for smooth regions (e.g., regions exhibiting no change or less than a threshold amount of change in pixel values across the region), thereby requiring fewer bits to signal block prediction vectors (e.g., relative to the size of the region), while using smaller partitions can be used for complex regions (where the decrease in distortion and/or entropy coding rate outweighs the additional signaling cost). For example, the encoder may determine whether a given region or block satisfies a smoothness threshold condition, and in response to determining that the given region or block satisfies the smoothness threshold condition, encode the given region or block in block prediction mode using a larger partition size (and otherwise, encode the given region or block in block prediction mode using a smaller partition size). As another example, the encoder may determine whether a given region or block satisfies a complexity threshold condition, and in response to determining that the given region or block satisfies the complexity threshold condition, encode the given region or block in block prediction mode using a smaller partition size (and otherwise, encode the given region or block in block prediction mode using a larger partition size). The ability to adaptively select different partition sizes may allow the block prediction mode to be used in a larger range of content types (e.g., graphics content, natural images, test patterns, fine text rendering, etc.).

Example Data Flow of Coding in Block Prediction Mode

Figure 9:
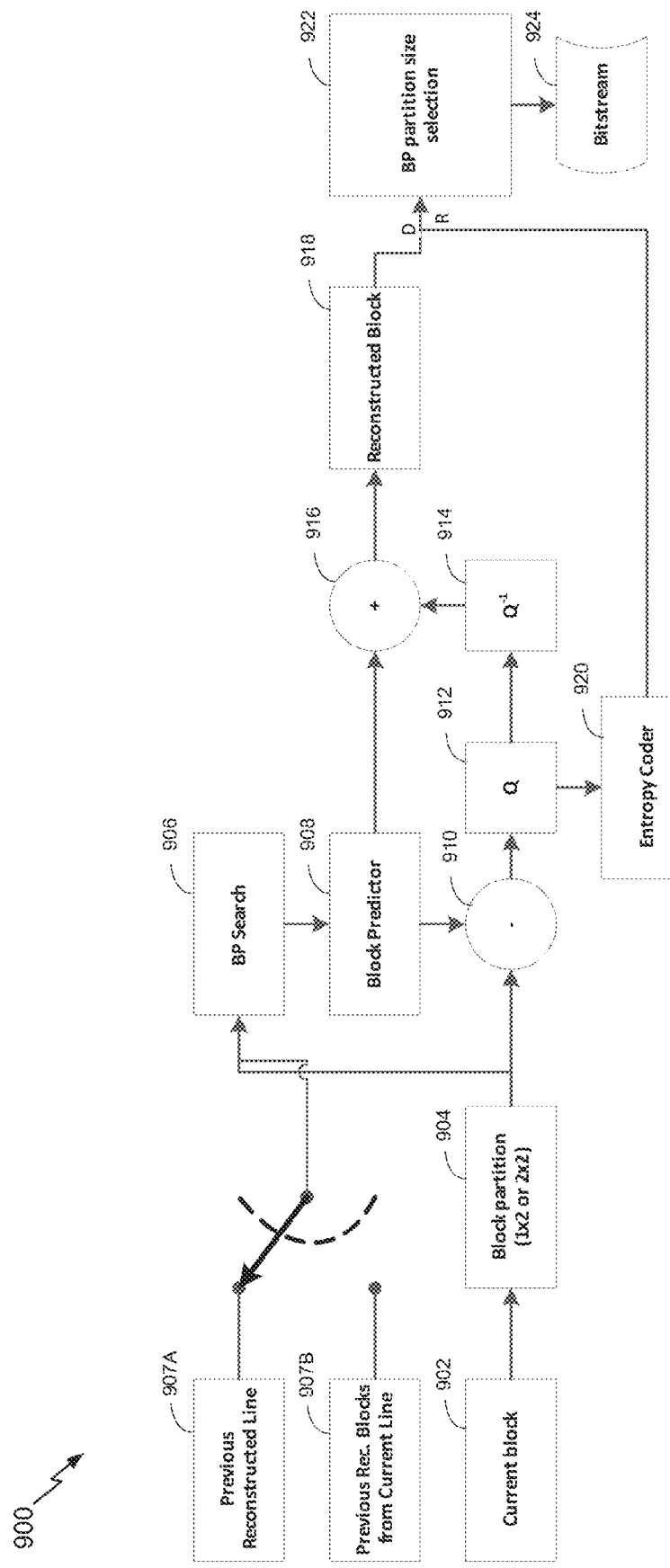
FIG. 9 is a block diagram illustrating a data flow for block prediction mode with adaptive partition size.

FIG. 9 illustrates an example data flow 900 for coding a block in block prediction mode using adaptive partition size. As illustrated in FIG. 9, a current block 902 to be predicted in block prediction mode includes a block partition 904. In one example, the block partition has a size of 1×2 or 2×2. A block prediction (BP) search 906 is conducted to identify a block or partition that has already been coded and available for predicting the current block 902 (or the block partition 904) in block prediction mode. As shown in FIG. 9, the BP search 906 may search within a search range, for example, including one or more previous reconstructed blocks 907A in a previous line (e.g., the line coded prior to coding the current line including the current block, such as the immediately preceding line or another preceding line) and/or previous reconstructed blocks 907B from the current line (e.g., the line including the current block).

The encoder determines a block predictor 908 based on a candidate block or partition identified in the search range. The block predictor 908 is subtracted from the current block 902 (or the current block partition 904 within the candidate block 902) at block 910, and the residual determined based on the subtraction is quantized at block 912. The quantized residual is entropy coded by the entropy coder 920. In addition, inverse quantization 914 is performed on the quantized residual and the result is added to the block predictor 908 at block 916 to produce a reconstructed block 918. A BP partition size selection 922 is performed based on the distortion performance (D) of the reconstructed block 918 and the rate performance (R) of the entropy encoded residual. A bitstream 924 is generated based on the selected BP partition size.

For example, the BP partition size selection 922 may take as input the rate (e.g., R) and distortion (e.g., D) of each partition region (e.g., 2×2) within the current block 902 and determine whether the partition region should be coded using a single block prediction vector (BPV) (e.g., 1 BPV total for a single 2×2 partition) or be partitioned and coded using multiple BPVs (e.g., 2 BPVs total, 1 BPV each for two 1×2 partitions) for prediction based on the RD tradeoff between the two options. Although some examples discussed herein involve a partition region size of 2×2 (thereby having partition sizes of 1×2, 2×1, and 2×2 as selectable options), the partition sizes selectable by the encoder are not limited to those used in such examples, (e.g., 1×2 and 2×2), and may include other sizes (e.g., 2×1) based on the block size and/or region size.

In some embodiments, the partition sizes are fixed (e.g., 1×2, 2×2, or any other sub-combination of pixels in the current partition region or block. For example, a block may have a block size of 2×8, and the block may be divided into sub-blocks or regions having a size of 2×2. The 2×2 sub-blocks or regions within the 2×8 block may further be partitioned into partitions having a size of 1×2. In such an example, each 1×2 partition may be predicted using a single BPV, independently from other partitions. In other embodiments, the partition sizes are variable, and how each block, sub-block, and/or region is coded in block prediction using which partition sizes may be determined by the encoder based on the rate and distortion performance of each partitioning scheme. For example, for a 2×2 region (e.g., current region) within the current block, if predicting the current region by dividing the current region into two 1×2 partitions and predicting the two 1×2 partitions separately using two BPVs (e.g., each pointing to a previously coded 1×2 partition within the defined search range) yields better rate and/or distortion performance (e.g., compared to other partitioning schemes such as 2×2), the current region may be predicted using the 1×2 partitioning scheme. On the other hand, if predicting the current region as a single 2×2 partition using one BPV (e.g., pointing to a previously coded 2×2 partition within the defined search range) yields better rate and/or distortion performance (e.g., compared to other partitioning schemes such as 1×2), the current region may be predicted using the 2×2 partitioning scheme. The process of determining the partitioning scheme to be used for coding a block in prediction mode is described in greater detail below with reference to FIG. 14.

Block Sizes and Sub-Block Sizes

For a block size of M×N, some embodiments are described with reference to sub-blocks (also referred to herein as regions) of size $M_{sub} \times N_{sub}$ where $M_{sub}<M$ and $N_{sub}<N$. In some implementations, for ease of computation, both $M_{sub}$ and $N_{sub}$ are aligned with the entropy coding groups within the M×N block. Each sub-block $M_{sub} \times N_{sub}$ within the block may either be (i) predicted using a single BPV without being further partitioned or (ii) partitioned into multiple partitions (e.g., into two 1×2 partitions), with a BPV used for each partition. The effective trade-off between using a single BPV for the entire sub-block or partitioning the sub-block into partitions that each have a BPV of its own is that signaling more BPVs will incur extra rate in the bitstream, however by using more BPVs, the distortion and entropy coding rates may decrease. In other words, by using more bits to signal additional BPVs, the number of bits used for signaling the residual (difference between the candidate block/region and the current block/region) may be reduced, which may further cause the number of bits used for entropy coding to be reduced as well. The encoder may compare each option (e.g., no partition vs. multiple partitions) in terms of RD cost and select whether or not to partition each sub-block or region based on the cost comparison or select a partitioning scheme from a plurality of partitioning schemes that provides the best RD performance.

Example Partitioning Scheme

Figure 10:
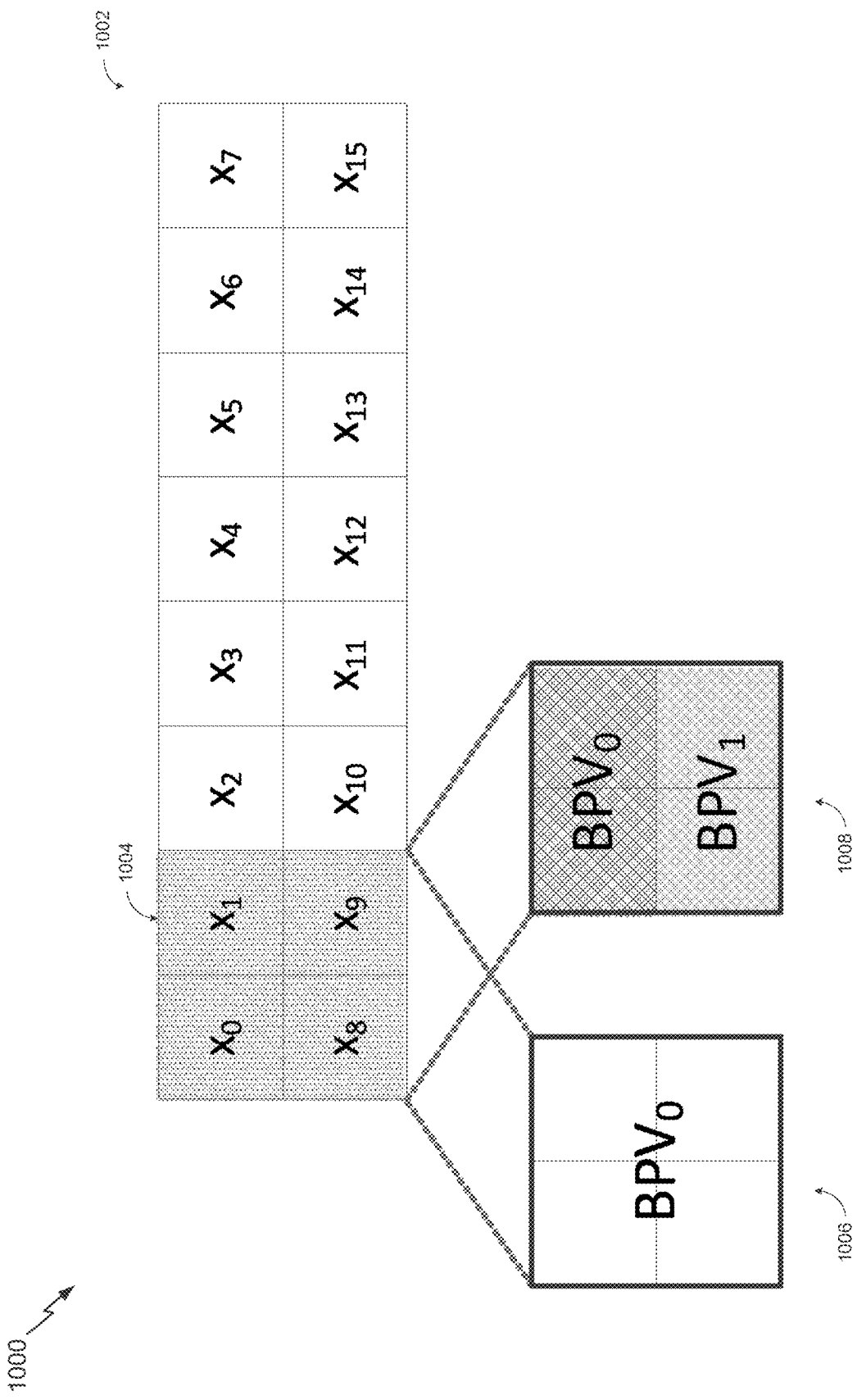
FIG. 10 is a block diagram illustrating the two different partition options for a 2×2 region with in a block.
Figure 11:
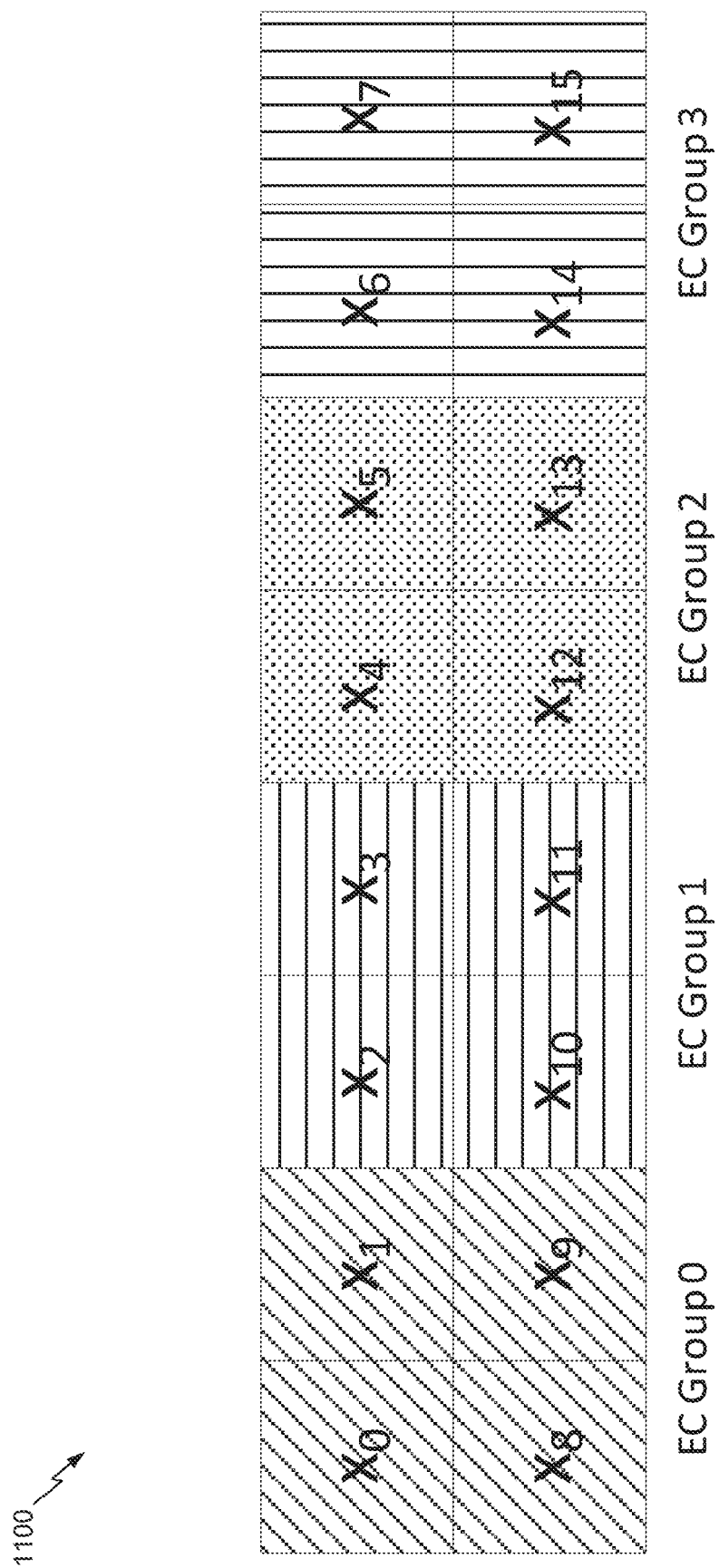
FIG. 11 is a block diagram illustrating the entropy coding groups for block prediction mode.

FIG. 10 illustrates a diagram 1000 illustrating an example partitioning scheme. In the FIG. 10, two partitioning options for a 2×2 sub-block or region is illustrated. In this example, a block 1002 (e.g., including pixels $X_0$-$X_{15}$) has a size of 2×8, and a sub-block or region 1004 (e.g., including pixels $X_0$, $X_1$, $X_8$, and $X_9$) within the block has a size of 2×2. Partitioning option 1006 illustrates an example in which the sub-block or region 1004 is predicted using a single BPV, and partitioning option 1008 illustrates an example in which the sub-block or region 1004 is predicted using two BPVs for each 1×2 partition within the sub-block or region 1004. Sub-blocks or regions having a size of 2×2 are used in some implementations such as the Advanced DSC (Adv-DSC) to align the sub-blocks or regions with the entropy coding group structures 1100 for block prediction mode, shown in FIG. 11. In the example of FIG. 11, entropy coding groups 0, 1, 2, and 3 are illustrated, each corresponding to one of the four 2×2 sub-blocks or regions within the block. However, the techniques described herein are not limited to such an embodiment and may be extended to any block size M×N and any sub-block size $M_{sub} \times N_{sub}$. However, in the examples illustrated below, parameters M=2, N=8, $M_{sub}$=2, $N_{sub}$=2 are used. In some embodiments, the sub-blocks and/or partitioning schemes may be determined based on the entropy coding groups. For example, the sub-blocks and/or partitioning schemes may be determined such that each sub-block and/or partitioning scheme is contained within a single entropy coding group.

Determining the Partition Size

The encoder may determine whether to (i) code each 2×2 region as a single 2×2 partition or (ii) divide the region into two 1×2 partitions and code each 1×2 partition separately, based on the minimum RD cost. The RD cost may be computed as shown below:

$$\text{cost}(2\times2) = D_{2\times2} + \lambda \cdot R_{2\times2}$$

$$\text{cost}(1\times2) = D_{1\times2} + \lambda \cdot R_{1\times2}$$

$$R_{2\times2} = 1 + \text{BPV}_{bits} + \text{EC}_{bits}^{2\times2}$$

$$R_{1\times2} = 1 + (2 \cdot \text{BPV}_{bits}) + \text{EC}_{bits}^{1\times2}$$

In some implementations, the BPV is signaled with a fixed number of bits ($\text{BPV}_{bits}$), equal to $\log_2(\text{SR})\log_2(\text{SR})$, where SR is the search space (or search range) associated with the block prediction mode. For example, if the search space consists of 64 positions, then $\log_2(64)=6$ bits are used to signal each BPV.

Figure 12:
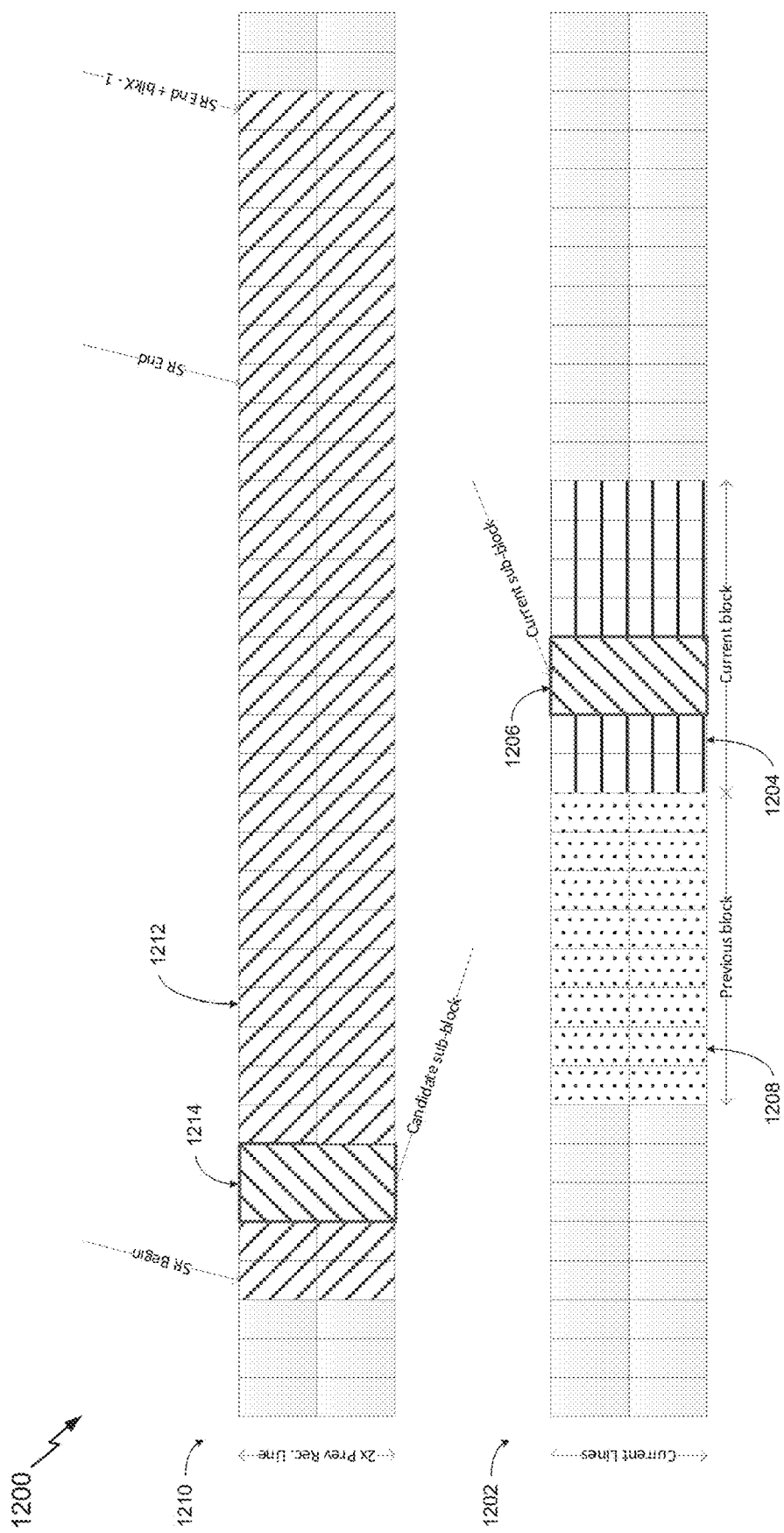
FIG. 12 is a block diagram illustrating the search space for a 2×8 block.

The search space for block prediction with variable partition size may be slightly different than the search range discussed with reference to FIGS. 3-6. In particular, a $M_{sub} \times N_{sub}$ sub-block may utilize a search space with height $M_{sub}$. In such cases, additional line buffers may be needed to implement block prediction with variable partition size relative to block prediction without variable partition size. An example of such search space is demonstrated in FIG. 12 for a sub-block size of 2×2. FIG. 12 illustrates a diagram 1200 illustrating an example search range. As shown in FIG. 12, a current line 1202 includes (i) a current block 1204 having a current sub-block 1206 and (ii) a previous block 1208. In the example of FIG. 12, a previous line 1210 includes a search range 1212 from which the encoder may select a candidate sub-block 1214 for predicting the current sub-block 1206. The search range or space for 1-D partitions (e.g. 1×2) may be similar to the search range previously described with reference to FIG. 3, relying on a single previous reconstructed line.

In some embodiments, distortions $D_{2\times2}$ and $D_{1\times2}$ may be computed using a modified sum of absolute differences (SAD) in the YCoCg color space. For example, the SAD distortion between pixel A (e.g., in the current sub-block or partition) and pixel B (e.g., in the candidate sub-block or region) in the YCoCg color space may be calculated as follows:

$$\text{SAD}(A,B) = |A_Y - B_Y| + 0.5 \cdot |A_{Co} - B_{Co}| + 0.5 \cdot |A_{Cg} - B_{Cg}|$$

If the current sub-block or partition has more than one pixel, the distortion for the entire current sub-block or partition may be calculated by summing the individual SADs calculated for each pixel in the current sub-block or partition. The pixel values of the current sub-block or partition may be the actual pixel value or a reconstructed pixel value (e.g., calculated based on a candidate predictor and a residual). In some implementations, the lambda parameter may be fixed at a value of 2. In other implementations, this parameter may be tuned depending on the block size, bitrate, or other coding parameters.

The entropy coding cost $\text{EC}_{bits}$ may be computed for each 2×2 region. The four samples in each entropy coding group may either come from the 2×2 quantized residual predicted from a single BPV (e.g., a 2×2 partition), or the 2×2 quantized residual utilizing two vectors (e.g., two 1×2 partitions). For example, the entropy coding cost may represent the number of bits needed to signal each entropy coding group in the bitstream (e.g., including the vector(s) and the residual). Based on the computed entropy coding costs, the encoder may select the partitioning scheme having the lowest cost for each 2×2 region. Although some embodiments are discussed with reference to 2×8 blocks having 2×2 sub-block sizes, 2×2 entropy coding groups, and two partitioning schemes (1×2 and 2×2), the techniques described herein may be extended to other block sizes, sub-block sizes, entropy coding groups, and/or partitioning schemes.

Signaling Coding Information in the Bitstream

Figure 13:
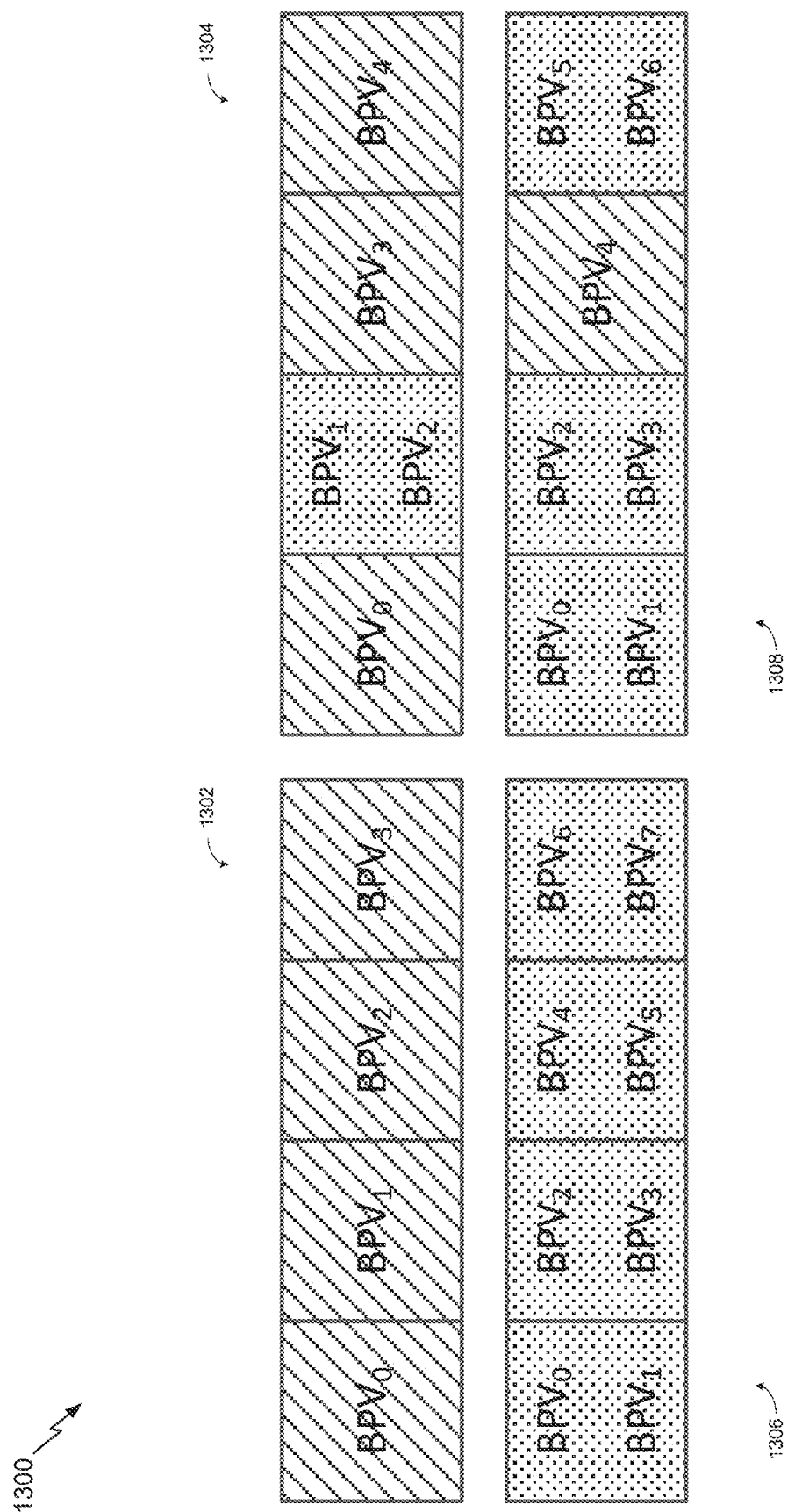
FIG. 13 is a block diagram illustrating different partition sizes being used for different regions of a block.

In the 2×8 block 1002 shown in FIG. 10, each of the four 2×2 regions may be partitioned based on the RD cost analysis discussed above. For example, each 2×2 region may be partitioned either into a single 2×2 partition or two 1×2 partitions. Four examples of such partitioning are illustrated by a diagram 1300 of FIG. 13. As shown in FIG. 13, block 1302 has four sub-blocks predicted based on the 2×2 partitioning scheme, block 1304 has three sub-blocks predicted based on the 2×2 partitioning scheme and one sub-block predicted based on the 1×2 partitioning scheme, block 1306 has four sub-blocks predicted based on the 1×2 partitioning scheme, and block 1308 has one sub-block predicted based on the 2×2 partitioning scheme and three sub-blocks predicted based on the 1×2 partitioning scheme. In addition to signaling the BPVs to the decoder, the encoder may also send one bit for each 2×2 region so that the decoder can properly infer the partitioning. In some implementations such as the Adv-DSC implementation, a group of four bits indicative of the partitioning scheme selected for each region within the block (e.g., each 2×2 region in the 2×8 block) is signaled in the bitstream. In such implementations, the four bits "1011" may indicate that the first, third, and fourth region (e.g., 2×2 sub-block) in the block are to be predicted or coded based on a first partitioning scheme (e.g., based on 1×2 partitions), while the second region (e.g., 2×2 sub-block) is to be predicted or coded based on a second partitioning scheme (e.g., based on 2×2 partitions). In some embodiments, following these four bits in the bitstream, the BPVs may be signaled using fixed bits per BPV. In the previous example (e.g., bit sequence of "1011"), 7 BPVs may be signaled.

Example Flowchart for Coding in Block Prediction Mode

Figure 14:
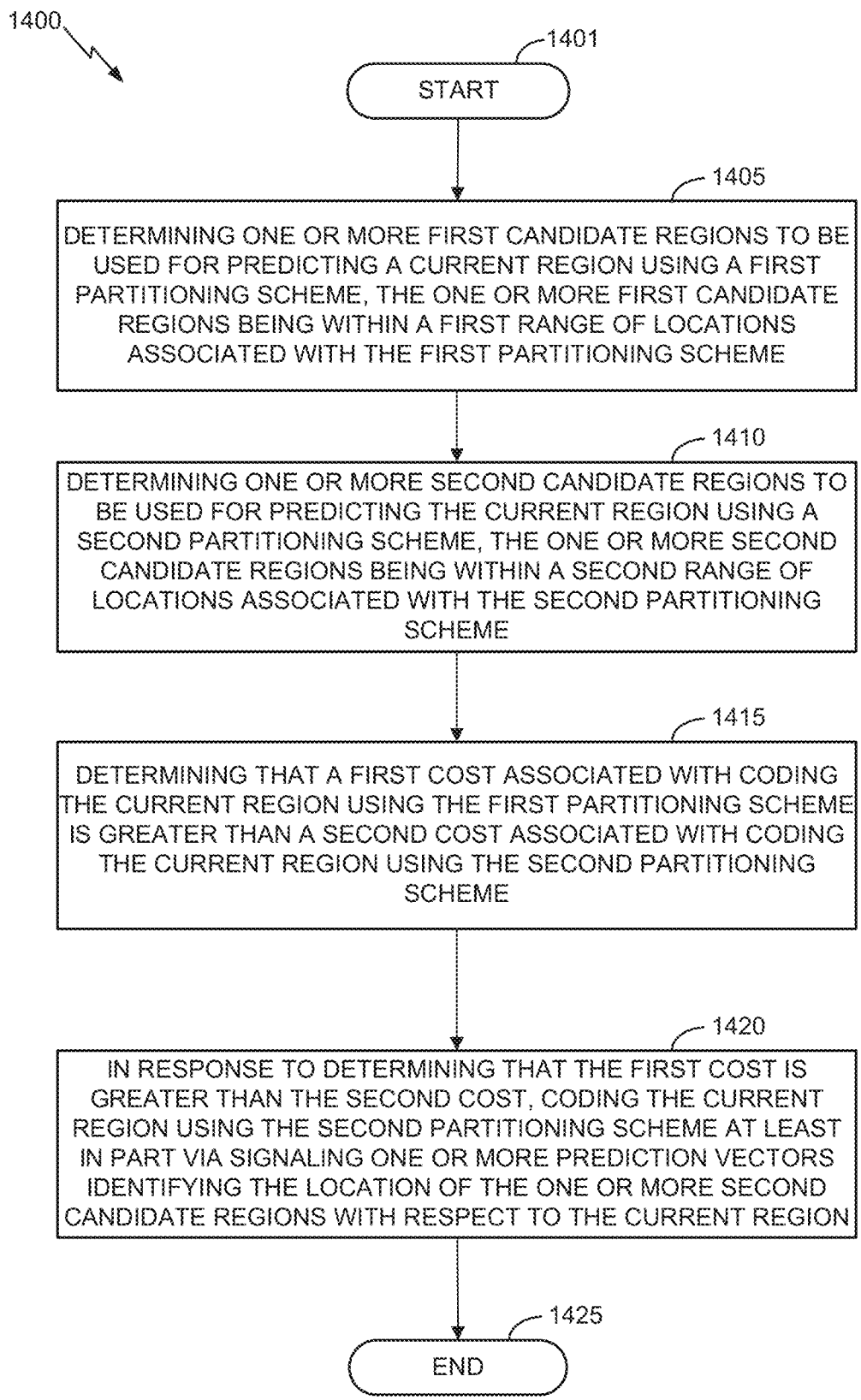
FIG. 14 is a flowchart illustrating a method for predicting a block of video data in block prediction mode using variable partition sizes.

With reference to FIG. 14, an example procedure for coding a block of video data in block prediction mode will be described. The steps illustrated in FIG. 14 may be performed by a video encoder (e.g., the video encoder 20 in FIG. 2A) or component(s) thereof. For convenience, method 1400 is described as performed by a video coder (also simply referred to as coder), which may be the video encoder 20 or another component.

The method 1400 begins at block 1401. At block 1405, the coder determines one or more first candidate regions to be used for predicting a current region (e.g., within a block of video data that is coded in block prediction mode) using a first partitioning scheme. For example, the first candidate region may be one of the 2×2 regions in a 2×8 block. The first partitioning scheme may be a partitioning scheme in which the current region is partitioned into multiple partitions (e.g., two 1×2 partitions). In some embodiments, the one or more first candidate regions are within a first range (e.g., the search range associated with the first partitioning scheme) of locations associated with the first partitioning scheme. The one or more first candidate regions may be stored in a memory of a video encoding device.

At block 1410, the coder determines one or more second candidate regions to be used for predicting the current region using a second partitioning scheme. For example, the second partitioning scheme may be a partitioning scheme in which the current region is not partitioned into multiple partitions (e.g., the current region is coded as a single 2×2 partition).

In another example, the second partitioning scheme may be a partitioning scheme in which the current region is partitioned into a different number of partitions than the number of partitions used for the first partitioning scheme. In some embodiments, the one or more second candidate regions are within a second range (e.g., the search range associated with the second partitioning scheme) of locations associated with the second partitioning scheme. The one or more second candidate regions may be stored in the memory of the video encoding device.

At block 1415, the coder determines that a first cost associated with coding the current region using the first partitioning scheme is greater than a second cost associated with coding the current region using the second partitioning scheme. For example, the code may calculate the cost based on the rate and distortion associated with coding the current region using the first partitioning scheme and the cost based on the rate and distortion associated with coding the current region using the second partitioning scheme, and compare the calculated costs.

At block 1420, the coder codes the current region using the second partitioning scheme at least in part via signaling one or more prediction vectors identifying the location of the one or more second candidate regions with respect to the current region. The method 1400 ends at block 1425.

In the method 1400, one or more of the blocks shown in FIG. 14 may be removed (e.g., not performed) and/or the order in which the method is performed may be switched. In some embodiments, additional blocks may be added to the method 1400. The embodiments of the present disclosure are not limited to or by the example shown in FIG. 14, and other variations may be implemented without departing from the spirit of this disclosure.

Extension to 4:2:0 and 4:2:2 Chroma Subsampling Formats

In some implementations, the block prediction techniques described in the present disclosure (e.g., using variable partition sizes in block prediction mode) may be utilized for 4:4:4 chroma sampling format only. This format is commonly used for graphics content. For example, the 4:4:4 chroma sampling format utilizes image or video data containing color components (e.g., luma components and chroma components) that have the same sampling rate (e.g., not using chroma sub-sampling). However, the 4:4:4 chroma sampling format may be less commonly used for other video applications. Due to the significant compression that chroma sub-sampling may provide, both 4:2:0 and 4:2:2 chroma sub-sampling formats are commonly used for video applications. For example, some versions of DSC (e.g., DSCv1.x) may support 4:2:0 and 4:2:2. Support for such chroma sub-sampling formats may be utilized or required by future DSC implementations. Thus, in some embodiments, the block prediction techniques described in the present disclosure (e.g., using variable partition sizes in block prediction mode) are extended to the 4:2:0 and/or 4:2:2 formats. Although 4:2:0 and 4:2:2 chroma sub-sampling formats are used herein, the various techniques described in the present application may be applied to other known sampling formats.

In some embodiments, the algorithm for block prediction with variable partition size works much in the same way independent of the chroma sampling format. In such embodiments, regardless of the format (e.g., 4:4:4, 4:2:2, 4:2:0, etc.), the determination of whether to use a single partition (e.g., 2×2) or to use multiple partitions (e.g., two separate 1×2 partitions) or the determination of the number of partitions to be used to code the current sub-block or region (e.g., 1, 2, 3, 4, etc.) may be made for each sub-block or region (e.g., 2×2 block) of luma samples. However, the number of chroma samples in each partition or in each block may differ depending on the sub-sampling format. In addition, the encoder decision may need to be modified in 4:2:2 and/or 4:2:0 chroma sub-sampling formats since alignment with entropy coding groups may no longer be possible for chroma components. Therefore, the rate (e.g., rate value associated with the partitions, such as the single 2×2 partition or the two separate 1×2 partitions) for each partition for the encoder decision (e.g., when the encoder decides whether to divide each 2×2 region into a single 2×2 partition or two 1×2 partitions based on the minimum RD cost) may rely solely on the luma samples for 4:2:2 and 4:2:0. For example, when calculating the SAD distortion, any terms related to the chroma component(s) may be set to zero.

BP Search for 4:2:0 Chroma Subsampling Format

Figure 15:
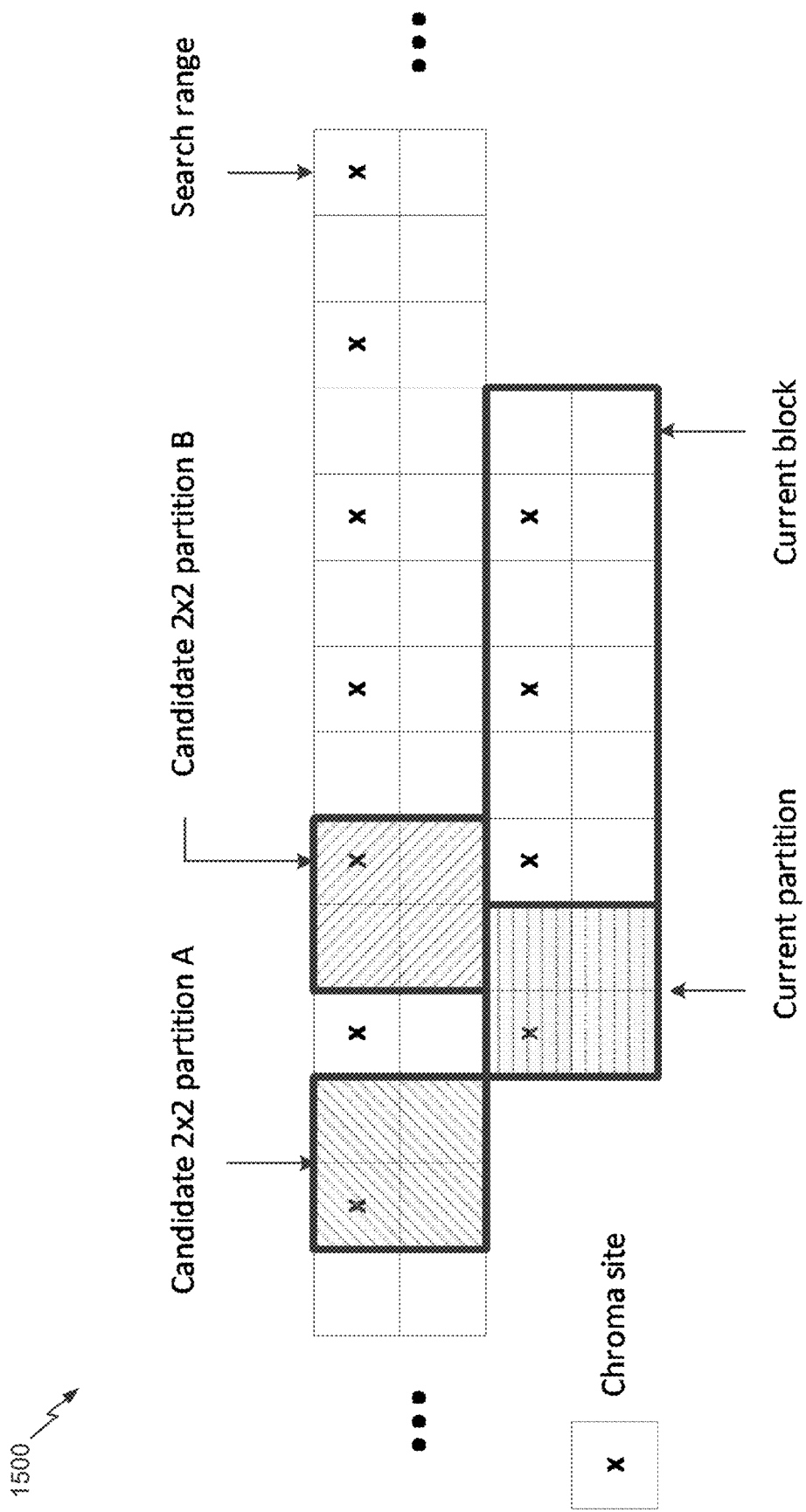
FIG. 15 is a block diagram illustrating an example block prediction search for 2×2 partitions for 4:2:0 chroma sub-sampling.
Figure 16:
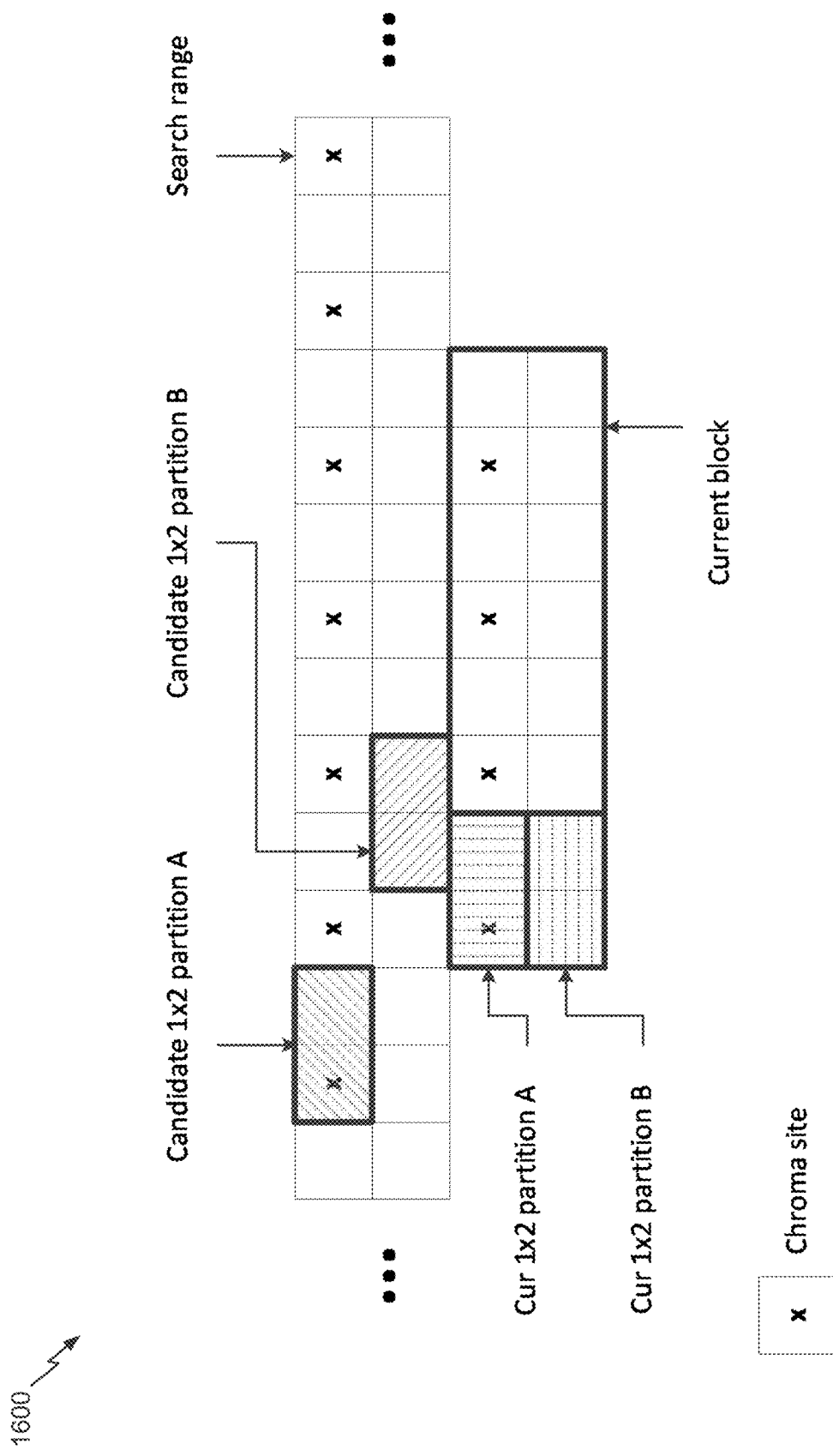
FIG. 16 is a block diagram illustrating an example block prediction search for 1×2 partitions for 4:2:0 chroma sub-sampling.

For 2×2 partitions in 4:2:0 mode (4:2:0 chroma sub-sampling format), each partition may contain a single chroma sample for each of the chroma components (e.g., Co and Cg, or Cb and Cr). In some embodiments, the chroma sample to be used (e.g., for calculating the RD cost and/or for predicting the samples in the current region or block) is the one that intersects with the partition. In other embodiments, the chroma sample to be used may be derived from an adjacent partition. An example 2×2 search 1500 for the 4:2:0 mode is shown in FIG. 15. In FIG. 15, the chroma sites (e.g., sample/pixel locations having chroma samples) are indicated using "X". For example, the top left sample of partition A, the top right sample of partition B, and the top left sample of the current partition comprise chroma sites that intersect the respective partitions. Such chroma sites may be used for all calculations performed for the respective partitions (e.g., to calculate the difference value using the chroma sample values).

For 1×2 partitions in 4:2:0 mode, a distinction may need to be made between 1×2 partitions in the first line of the current block and 1×2 partitions in the second line of the current block, because there may be no chroma sites in the second line of the current block. For example, for partitions in the first line of the current block, the calculation of the distortion values may involve two luma samples and one chroma sample for each chroma component. For partitions in the second line of the current block, the calculation of the distortion values may involve only the luma samples (e.g., two luma samples). In the example 1600 of FIG. 16, the current 1×2 partition A is in the first line and includes a chroma site. Thus, the candidate partition selected for predicting the current 1×2 partition A is the candidate 1×2 partition A, which also includes a chroma site. Similarly, the current 1×2 partition B is in the second line and does not include a chroma site. Thus, the candidate partition selected for predicting the current 1×2 partition B is the candidate 1×2 partition B, which also does not include a chroma site.

BP Search for 4:2:2 Chroma Subsampling Format

Figure 17:
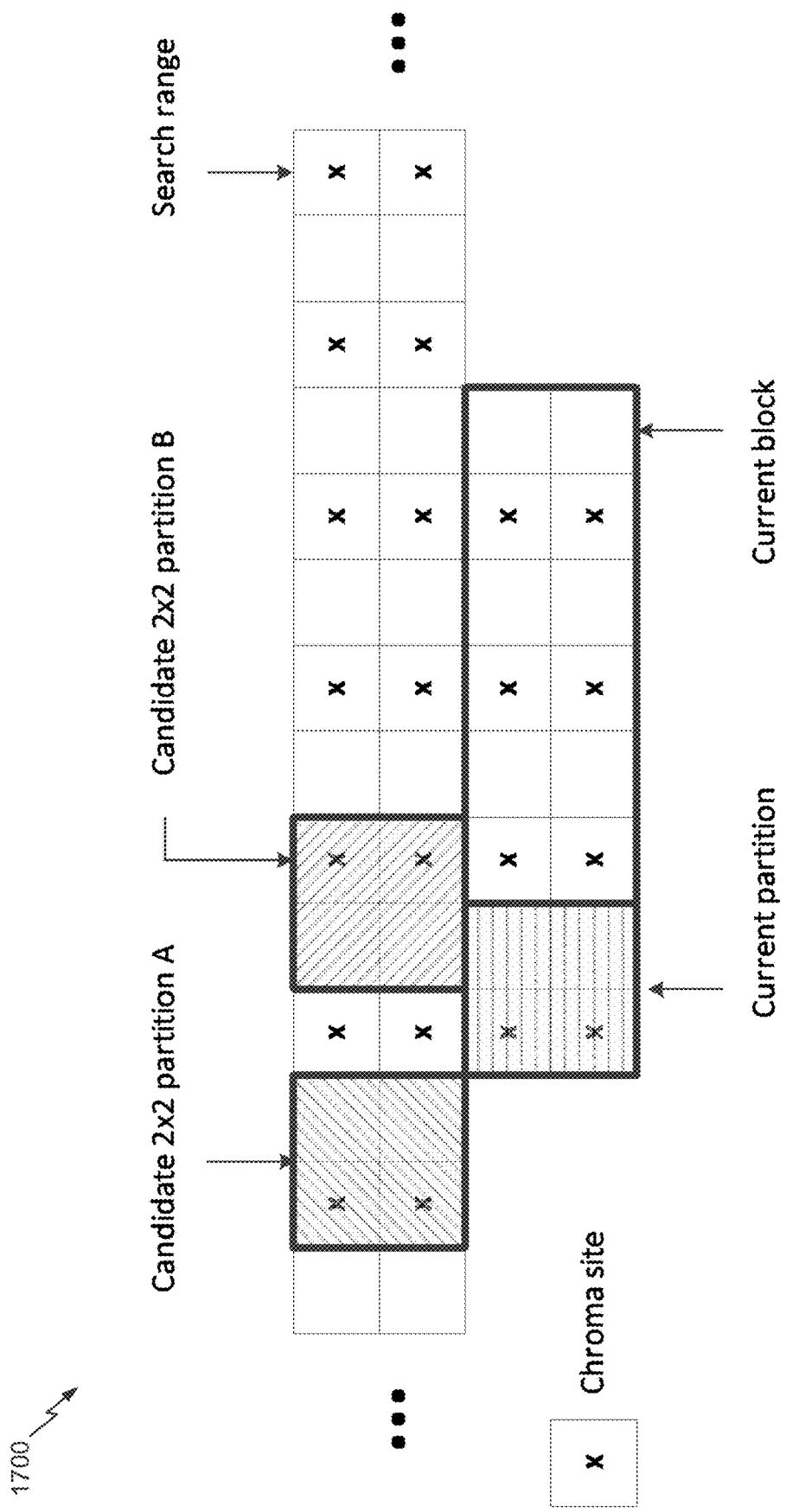
FIG. 17 is a block diagram illustrating an example block prediction search for 2×2 partitions for 4:2:2 chroma sub-sampling.

For 2×2 partitions in 4:2:2 mode (4:2:2 chroma sub-sampling format), each partition may contain 4 luma samples, and 2 chroma samples for each of the chroma components (e.g., Co and Cg, or Cb and Cr). An example 2×2 search 1700 for the 4:2:2 mode is shown in FIG. 17. In FIG. 17, the chroma sites (e.g., pixel locations having chroma samples) are indicated using "X". For example, the two left samples of partition A, the two right samples of partition B, and the two left samples of the current partition comprise chroma sites that intersect the respective partitions. Such chroma sites may be used for all calculations performed for the respective partitions (e.g., to calculate the difference value using the chroma sample values).

Figure 18:
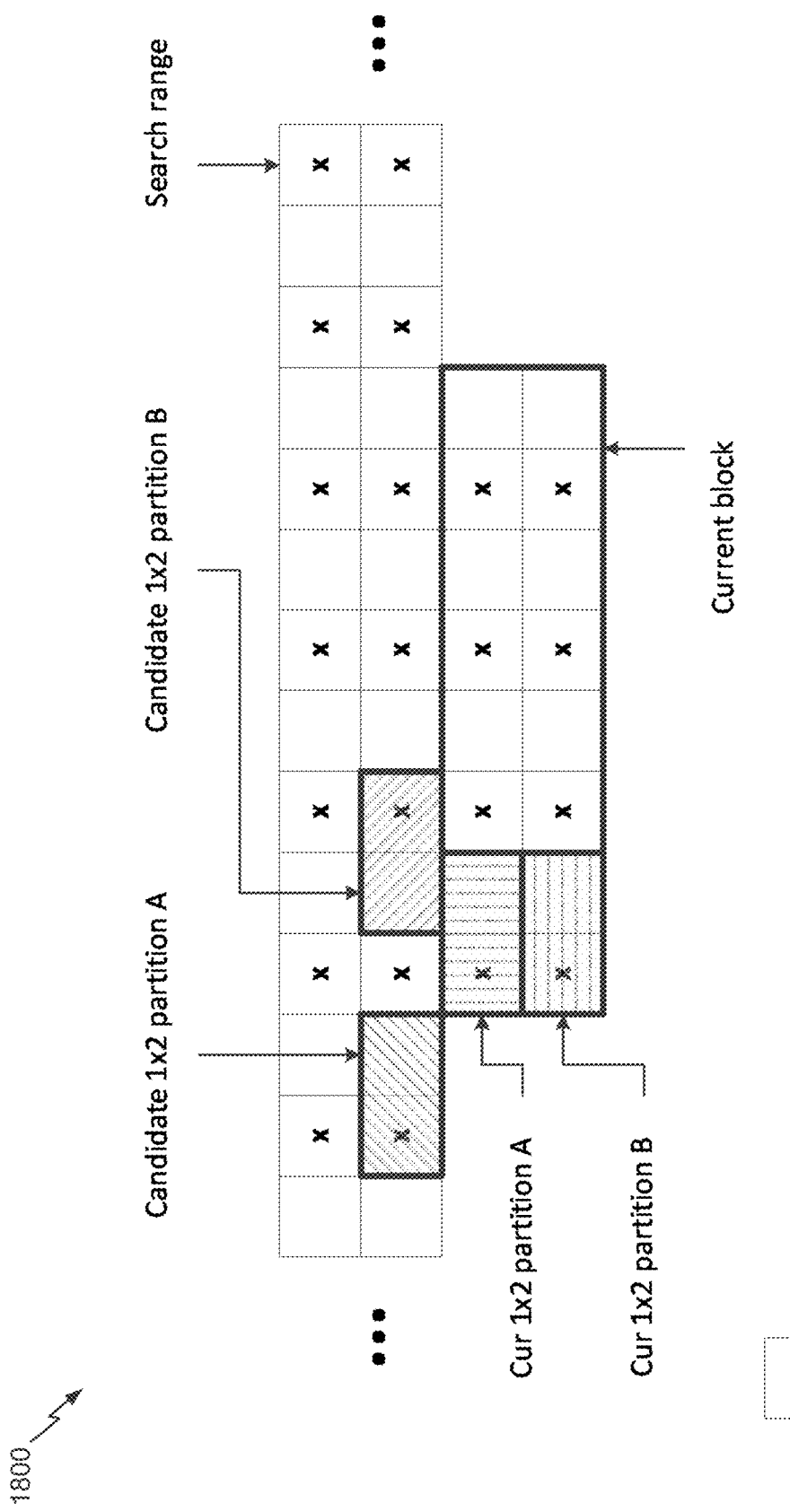
FIG. 18 is a block diagram illustrating an example block prediction search for 1×2 partitions for 4:2:2 chroma sub-sampling.
Figure 19:
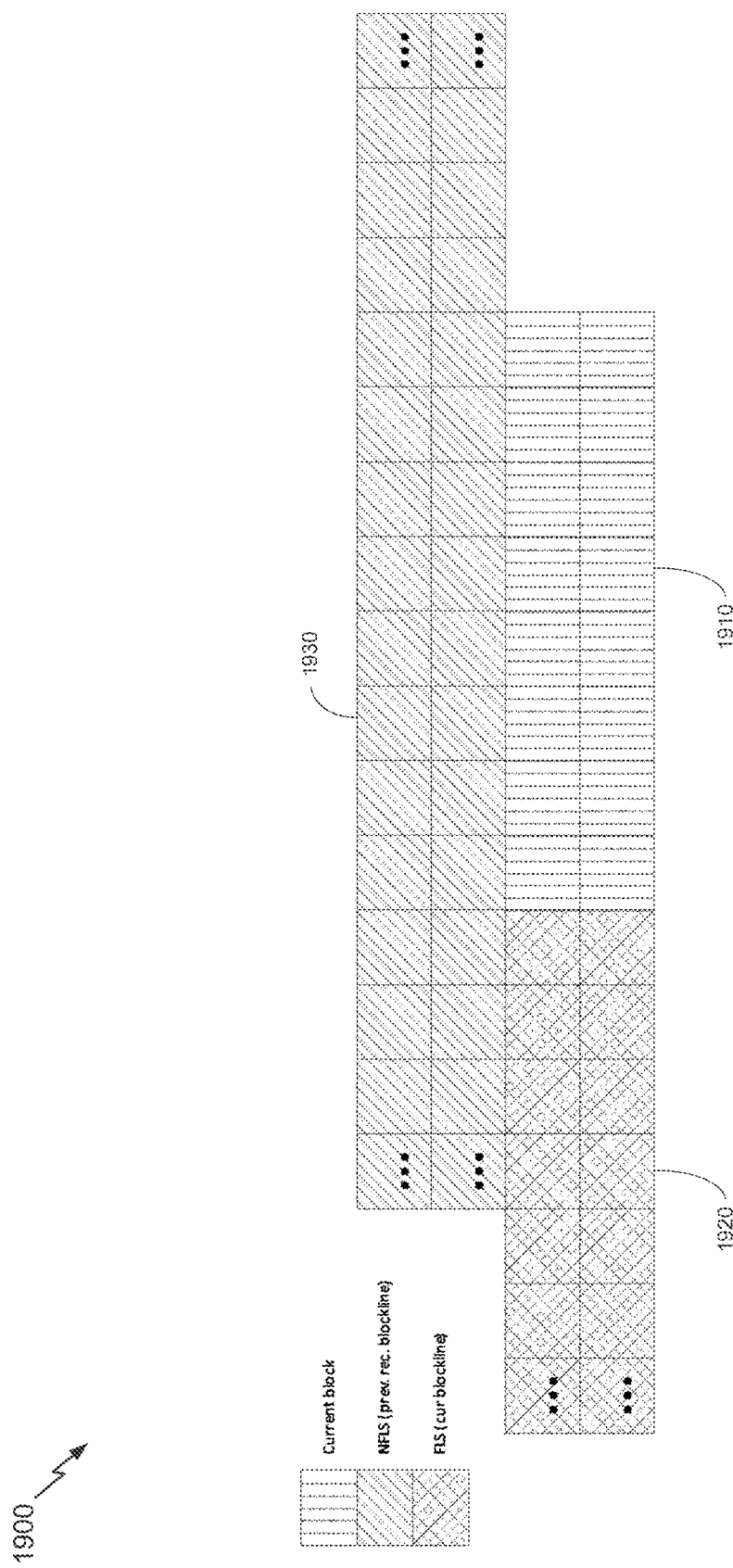
FIG. 19 is a block diagram illustrating single search ranges for block prediction mode.

For 1×2 partitions in 4:2:2 mode, each partition contains 2 luma samples and 1 chroma sample for each of the chroma components (e.g., Co and Cg, or Cb and Cr). Unlike in the 4:2:0 mode, there may be no distinction between partitions in the first line of the current block and partitions in the second line of the current block in the 4:2:2 mode. An example block prediction search 1800 for 1×2 partitions for 4:2:2 chroma sub-sampling is illustrated in FIG. 18. In the example of FIG. 18, the current 1×2 partition A is in the first line and the current 1×2 partition B is in the second line, and each of current partitions A and B includes a chroma site. Current partition A is predicted based candidate 1×2 partition A, which includes a chroma site in the first sample, and current partition B is predicted based on candidate 1×2 partition B, which includes a chroma site in the second sample. Thus, regardless of where the chroma site is located within the candidate partition, the chroma sample may be used to predict the chroma sample in the current partition.

Encoder Decision

In the 4:2:2 and 4:2:0 formats, there may be fewer than 4 entropy coding groups per block for each chroma component. For example, four entropy coding groups may be used for the luma component, and two (or one) entropy coding groups may be used for the orange chroma component, and two (or one) entropy coding groups may be used for the green chroma component. The number of entropy coding groups used for coding a given block may be determined based on the number of luma or chroma samples in the given block. In some embodiments, the entropy coding groups are determined by the encoder based on the coding mode in which a given block is coded. In other embodiments, the entropy coding groups are set by the applicable coding standard (e.g., based on the coding mode in which the given block is coded).

In some embodiments, the quantity $EC_{bits}$ is not determined exactly by the encoder for chroma. In some of such embodiments, the encoder may determine whether to use 1×2 or 2×2 partitions, based on the entropy coding rate calculated using only the luma samples for 4:2:2 and 4:2:0 formats. In other embodiments, the quantity $EC_{bits}$ is determined by the encoder for chroma, and the encoder may determine whether to use 1×2 or 2×2 partitions, based on the entropy coding rate calculated using both luma and chroma samples for 4:2:2 and 4:2:0 formats.

Signaling

In some embodiments, the number of entropy coding groups to be transmitted from the encoder to the decoder for each block or for each color component may be changed depending on the chroma sub-sampling format. In some implementations, the number of entropy coding groups is changed to ensure that the codec throughput is sufficiently high. For example, in the 4:4:4 mode, a 2×8 block may include four entropy coding groups, as illustrated in FIG. 11. In such an example, four entropy coding groups may be used (e.g., signaled by the encoder) for each color component (e.g., Y, Co, and Cg). Table 1 describes example changes to the number of entropy coding groups used for the 4:2:2 and 4:2:0 modes. The remainder of the signaling described above (e.g., signaling of the BPVs, signaling of the indication of the partitioning scheme, etc.) may be unchanged (from the signaling described with respect to the 4:4:4: mode) for the 4:2:2 and 4:2:0 modes. For example, in Table 1, component 0 may correspond to luma (Y), component 1 may correspond to orange chroma (Co), and component 2 may correspond to green chroma (Cg).

TABLE 1 number of entropy coding groups per component for different
chroma sub-sampling formats (assuming a block size of 2 × 8)

| Chroma format | Component 0 | Component 1 | Component 2 |
|---|---|---|---|
| 4:4:4 | 4 | 4 | 4 |
| 4:2:2 | 4 | 2 | 2 |
| 4:2:0 | 4 | 1 | 1 |

Advantages

One or more block prediction mode techniques described in the present disclosure may be implemented using an asymmetrical design. The asymmetric design allows more expensive procedures to be performed on the encoder side, decreasing complexity of the decoder. For example, because the vector(s) are explicitly signaled to the decoder, the encoder does the majority of the work compared with the decoder. This is desirable as the encoder is often part of a System on a Chip (SoC) design, running at a high frequency on a cutting-edge process node (e.g., 20 nm and below). Meanwhile, the decoder is likely to be implemented on a Display Driver Integrated Circuit (DDIC) chip-on-glass (COG) solution with a limited clock speed and a much larger process size (e.g., 65 nm and above).

Additionally, the adaptive selection of block partition sizes allows the block prediction mode to be used for a broader range of content types. Since signaling the BPVs explicitly can be expensive, the variable partition size allows for reduced signaling cost for image regions which can be well-predicted using a 2×2 partition. For highly complex regions, the 1×2 partition size can be selected if either the entropy coding rate can be sufficiently reduced to make up for the higher signaling cost, or if distortion can be sufficiently reduced such that the RD tradeoff is still in favor of 1×2. For example, the adaptive selection of block partition sizes may increase performance across all content types, including natural images, test patterns, fine text rendering, etc. In some embodiments, the adaptive partitioning techniques discussed herein may be extended by considering block partition sizes larger than 2×2 and/or block sizes larger than 2×8.

One or more techniques described herein may be implemented in a fixed-bit codec employing a constant bit rate buffer model. Such a model, bits stored in the rate buffer are removed from the rate buffer at a constant bit rate. Thus, if the video encoder adds too many bits to the bitstream, the rate buffer may overflow. On the other hand, the video encoder may need to add enough bits in order to prevent underflow of the rate buffer. Further, on the video decoder side, the bits may be added to rate buffer at a constant bit rate, and the video decoder may remove variable numbers of bits for each block. To ensure proper decoding, the rate buffer of the video decoder should not "underflow" or "overflow" during the decoding of the compressed bitstream. The one or more techniques described herein may ensure that such underflow or overflow is prevented during encoding and/or decoding. In some embodiments, the encoder may operate under a bit-budget constraint, in which the encoder has a fixed number of bits to code a given region, slice, or frame. In such embodiments, being able to know exactly (and not having to estimate) how many bits each one of a plurality of coding modes would need to be able to code a given region, slice, or frame is critical to the encoder, so that the encoder can ensure that the bit-budget or other bit/bandwidth related constraints can be satisfied. For example, the encoder may code the given region, slice, or frame in a given coding mode without having to implement any precautionary measures in case the coding of the given region, slice, or frame requires more bits that estimated.

Further, one or more techniques described herein overcome specific technical problems associated with the video compression technology in transmission over display links. By allowing a region to be coded based on multiple candidate regions (e.g., each partition in the region predicted based on the corresponding one of the multiple candidate regions), video encoders and decoders can provide a customized prediction based on the nature of the region (e.g., smooth, complex, etc.), thereby improving the video encoder and decoder (e.g., hardware and software codecs) performance.

Multiple Search Ranges for Block Prediction Mode

As discussed with reference to FIGS. 3-6, the search space (e.g., spatial locations of pixels that the encoder may search in order to find a candidate block) may differ based on the characteristics of the current block. For example, the search space may potentially encompass all previously reconstructed blocks/pixels. In some embodiments, the encoder and/or the decoder may limit the search for a candidate block to a specified portion (e.g., a "search range" defined by one or more parameters that are either predefined or signaled in the bitstream) within the search space, for example, to reduce computational complexity. In some implementations, block prediction utilizes a single search range for each block coded in block prediction mode. In these implementations, the location of the search range with respect to the current block may depend on whether the current block is in the FLS (first line of a slice) or in the NFLS (non-first line of a slice). As shown in diagram 1900 of FIG. 19, if the current block 1910 is in the FLS, the search range may be to the left of the current block in the same blockline (e.g., FLS search range 1920), and if the current block is in the NFLS, the search range may be in a blockline immediately above the current blockline (e.g., NFLS search range 1930). The term blockline, in addition to having its ordinary meaning, may include all the raster scan lines belonging to a block. For example, if the block size were 2×8 pixels (Advanced Display Stream Compression [ADSC] has a standard block size of 2×8 pixels), a blockline would include two raster scan lines.

In contrast, in some embodiments of the present disclosure, the encoder and/or the decoder may maintain multiple search ranges. By allowing multiple search ranges to be used for coding a block in block prediction mode, the likelihood of locating superior candidate partitions may be increased (e.g., compared to prior implementations considering only a single search range for each block coded in block prediction mode), thereby improving the coding efficiency and/or coding performance of the block prediction mode. Further, by allowing the encoder to adaptively select the search range to be used for coding each block, the performance of the block prediction scheme may further be improved.

In some of such embodiments, although multiple search ranges may be considered for use in coding a given block in block prediction mode, only one of the search ranges may be allowed to be used at a time. For example, each block being coded in block prediction mode may be associated with one, but not both, of the multiple search ranges. In some embodiments, if a block coded in block prediction mode has multiple partitions, the coding of the partitions may be constrained such that each partition is to be coded using the same search range selected for the block. By limiting the number of search ranges used for a single block, the encoder can easily signal to the decoder which search range is used using a single bit. In other embodiments, more than one search range may be used for a single block. For example, a first search range may be used for coding a first partition in the single block, and a second search range different from the first search range may be used for coding a second partition in the single block.

Figure 20:
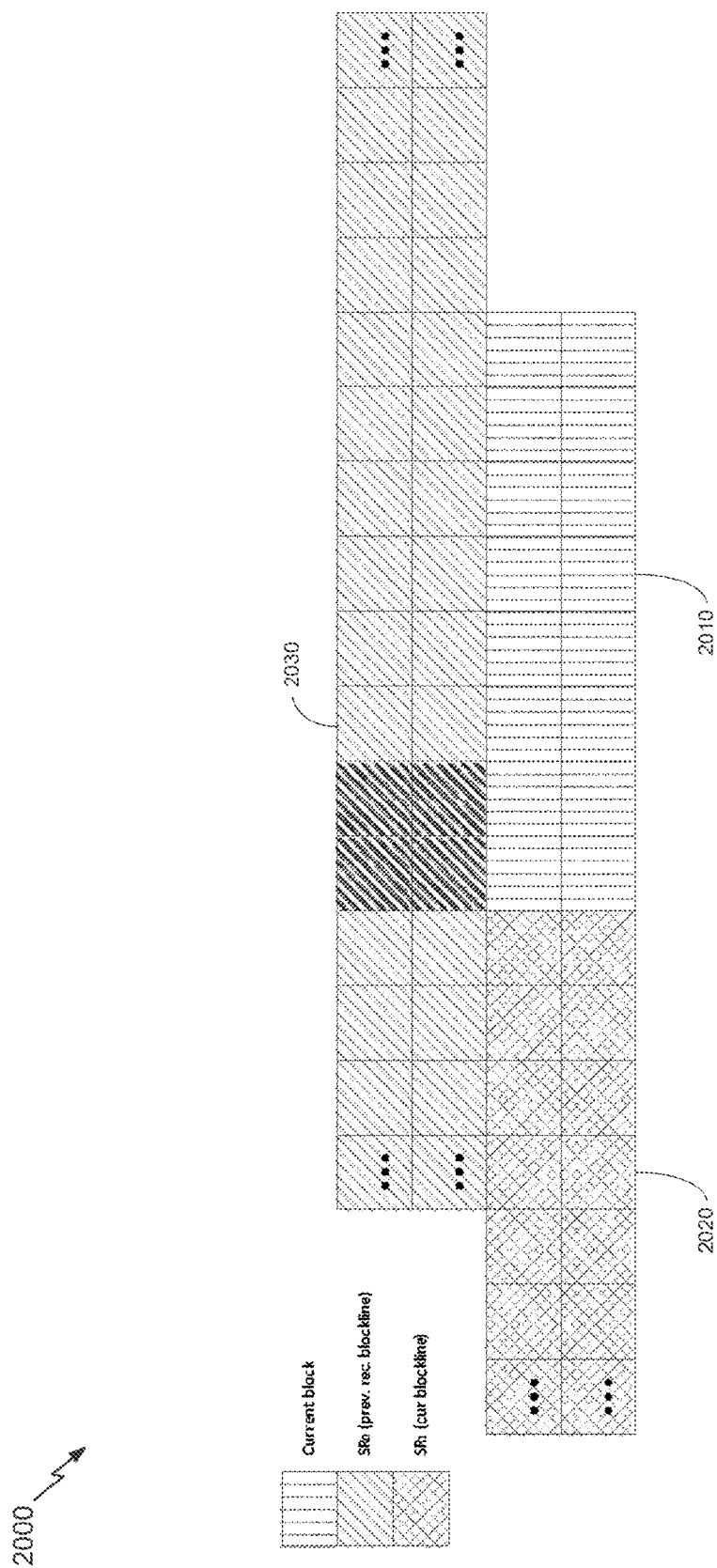
FIG. 20 is a block diagram illustrating multiple search ranges for block prediction mode.

In some embodiments of the present disclosure, two search ranges ($SR_0$ and $SR_1$) are maintained by the encoder and/or the decoder, as shown in diagram 2000 of FIG. 20. For blocks within the FLS, there may be no distinction between the two search ranges (or there may be no difference in the outcome or performance of the block prediction) as the only option is to use the current blockline for reference. For example, if the current block 2010 is in the FLS, only the $SR_0$ search range 2020 may be used for coding the current block 2010, and the $SR_0$ search range 2030 may not be available. On the other hand, if the current block 2010 is within NFLS, the $SR_0$ search range 2020 and the $SR_1$ search range 2030 may both be available and either of the search ranges 2020 and 2030 may be used for coding the current block 2010 in block prediction mode. As illustrated in FIG. 20, the $SR_0$ search range 2030 involves data (e.g., pixels coded prior to the coding of the current block) from the previous reconstructed blocklines (e.g., one or more blocklines that were most recently reconstructed), and the $SR_1$ search range 2020 involves data (e.g., pixels coded prior to the coding of the current block) from the current blockline (e.g., to the left of the current block). In some embodiments, one or more most recently reconstructed pixels or blocks may be omitted from the search range(s) for pipelining reasons. For example, one or more blocks (e.g., a threshold number of pixels or blocks) immediately to the left of the current block may be omitted from the search range $SR_1$. The number of pixels or blocks omitted from the search range(s) may depend on pipelining constraints.

The encoder may perform a block prediction search for all partitions within the current block independently for the two search ranges. For example, if the current block has two partitions, the encoder may perform the block prediction search for the first partition in the first search range, and then perform the block prediction search for the second partition in the first search range. Based on the search, the encoder may determine a first cost for coding the two partitions in the current block using blocks or block partitions in the first search range. Then, the encoder may perform the block prediction search for the first partition in the second search range, and then perform the block prediction search for the second partition in the second search range. Based on the search, the encoder may determine a second cost for coding the two partitions in the current block using blocks or block partitions in the second search range. The blocks or block partitions in the search ranges may be selected such that the rate and distortion cost is minimized for the entire current block (e.g., for predicting all the partitions within the current block).

Having determined the cost (e.g., rate and distortion estimate) for each search range, and the encoder can select between the two options by minimizing RD cost (e.g., $D+\lambda \cdot R$), as discussed in the present disclosure. The encoder may select the search range that yields the lowest RD cost, and code the current block using the selected search range. The indication of the search range to be used for decoding the current block is transmitted to the decoder by, for example, signaling a one-bit flag for each block explicitly in the bitstream. Thus, the changes on the decoder side necessitated by the use of multiple search ranges are minimal. Essentially, one search range is replaced for another, and all the other steps for block prediction may be performed as in the implementations that do not use multiple search ranges.

In other embodiments, the one-bit flag signaling the selected search range may be omitted. In such embodiments, the search ranges may each be associated with a separate instance of the block prediction mode, in which the search range index may be implicitly signaled by the mode header. For example, if three bits are used to signal the coding mode associated with a block, and only six coding modes are available to the encoder or decoder, the same three-bit syntax element can be used to signal two additional coding modes (e.g., one for a block prediction mode that always uses the first search range or uses the first search range by default, and another for a block prediction mode that always uses the second search range or uses the second search range by default). Thus, by utilizing existing syntax elements used for signaling the coding mode, bit savings may be achieved.

Coding in Block Prediction Mode Using Multiple Search Ranges

Figure 21:
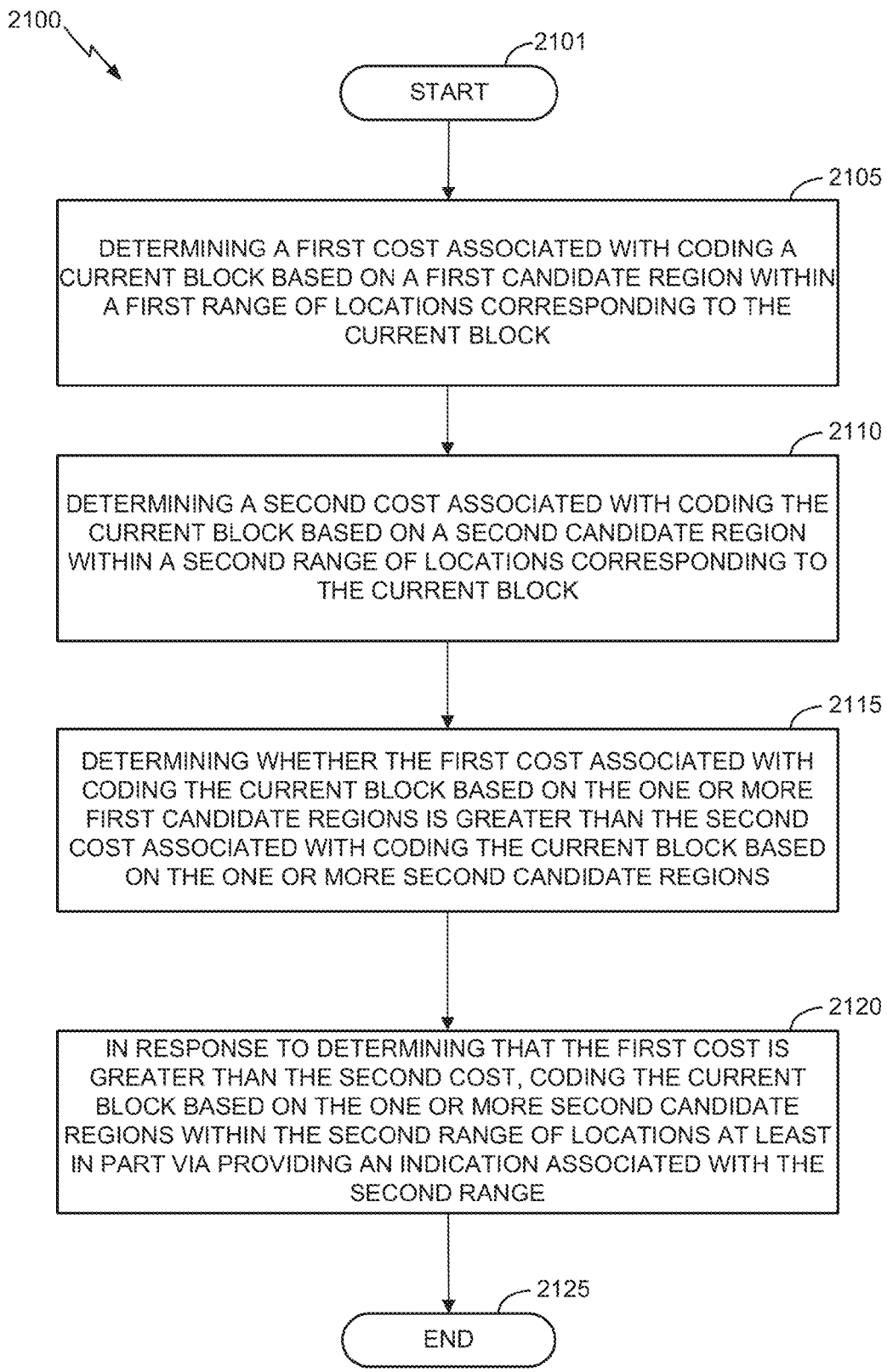
FIG. 21 is a flowchart illustrating a method for predicting a block of video data in block prediction mode using multiple search ranges.

With reference to FIG. 21, an example procedure for coding a block of video data in block prediction mode will be described. The steps illustrated in FIG. 21 may be performed by a video encoder (e.g., the video encoder 20 in FIG. 2A) or component(s) thereof. For convenience, method 2100 is described as performed by a coder, which may be the video encoder 20 or another component.

The method 2100 begins at block 2101. At block 2105, the coder determines a first cost associated with coding a current block (e.g., a block of video data that is currently being coded) based on a first candidate region within a first range of locations corresponding to the current block. The first candidate region may have the same size (e.g., same dimensions and/or same number of pixels) as the current block. The first candidate region may include a block or a portion of a block that was previously coded and is now being used to code the current block. In some embodiments, the first candidate region may be a collection of blocks or block partitions that are each used to code a different portion of the current block. For example, the current block may include four block partitions, and each of the four block partitions may be predicted or coded using a different block or block partition of the first candidate region within the first range of locations. In some implementations, multiple block partitions within the current block may be coded based on the same block or block partition of the first candidate region within the first range of locations. The first range of locations (e.g., a first search range) may be a search range specified by the encoder or by an applicable coding standard. The first range of locations may be analogous to one of the example search ranges discussed in the present disclosure. The first range of locations may comprise a plurality of blocks or block partitions that are reconstructed and used to predict or code subsequent (e.g., in coding order or raster scanning order) blocks and/or block partitions. The first range of locations may include a raster scan line that overlaps the current block. In other embodiments, the first range of locations does not include a raster scan line that overlaps the current block. The video data associated with the first candidate region may be stored in a memory of a video encoding device.

At block 2110, the coder determines a second cost associated with coding the current block based on a second candidate region within a second range of locations corresponding to the current block. The second candidate region may have the same size (e.g., same dimensions and/or same number of pixels) as the current block. The second candidate region may include a block or a portion of a block that was previously coded and is now being used to code the current block. In some embodiments, the second candidate region may be a collection of blocks or block partitions that are each used to code a different portion of the current block. For example, the current block may include four block partitions, and each of the four block partitions may be predicted or coded using a different block or block partition of the first candidate region within the second range of locations. In some implementations, multiple block partitions within the current block may be coded based on the same block or block partition of the first candidate region within the second range of locations. The second range of locations may be a search range specified by the encoder or by an applicable coding standard. The second range of locations may be analogous to the examples search ranges discussed in the present disclosure. The second range of locations may comprise a plurality of blocks or block partitions that are reconstructed and used to predict or code subsequent (e.g., in coding order or raster scanning order) blocks and/or block partitions. In some embodiments, the first range of locations and the second range of locations are mutually exclusive. Alternatively or additionally, the first range of locations and the second range of locations may occupy different raster scan lines. The second range of locations may include a raster scan line that overlaps the current block. In other embodiments, the second range of locations does not include a raster scan line that overlaps the current block. For example, as shown in FIG. 20, the two search ranges 2020 and 2030 do not overlap with each other. The video data associated with the second candidate region may be stored in the memory of the video encoding device.

At block 2115, the coder determines whether the first cost associated with coding the current block based on the first candidate region is greater than the second cost associated with coding the current block based on the second candidate region. For example, the coder may calculate the cost based on the rate and distortion associated with coding the current block using the first candidate region within the first range of locations (e.g., within the first search range) and the cost based on the rate and distortion associated with coding the current block using the second candidate region within the second range of locations (e.g., within the second search range), and compare the calculated costs. In some embodiments, the current block may comprise a plurality of block partitions. In some of such embodiments, calculating the first and second costs may include (i) determining a plurality of block partitions within the relevant search range (e.g., the first search range and the second search range, respectively) to be used for coding the corresponding plurality of block partitions in the current block, (ii) determining the individual costs for coding the individual block partitions within the current block based on the plurality of block partitions within the relevant search range, and (iii) calculating the first and second costs based on the individual costs. For example, the first and second costs may be calculated by summing the individual costs. Alternatively, the first and second costs may be calculated by averaging the individual costs.

At block 2120, the coder, in response to determining that the first cost is greater than the second cost, codes the current block based on the second candidate region within the second range of locations at least in part via providing an indication associated with the second range. In some embodiments, the indication may be a 1-bit flag indicative of whether the current block is to be coded based on (i) the first candidate region within the first range of locations or (ii) the second candidate region within the second range of locations. For example, if the flag value is equal to 0, the flag may indicate that the current block is to be coded based on one or more blocks or block partitions in the first search range (e.g., based on the first candidate region within the first range of locations), and if the flag value is equal to 1, the flag may indicate that the current block is to be coded based on one or more blocks or block partitions in the second search range (e.g., based on the second candidate region within the second range of locations). In other embodiments, the indication may be a multi-bit syntax element configured to indicate the coding mode associated with the current block. For example, the syntax element may indicate which one of a plurality of coding modes should be used to code the current block. One of the coding modes may be a block prediction mode. In some embodiments, if the syntax element has one value (of a plurality of possible values), the current block is to be coded in a block prediction mode that only uses the first search range (or one that uses the first search range by default, unless provided otherwise), and if the syntax element has another value (of the plurality of possible values), the current block is to be coded in a block prediction mode that only uses the second search range (or one that uses the second search range by default, unless provided otherwise). If the syntax element has yet another value (of the plurality of possible values), the current block may be coded in a coding mode other than the block prediction mode. The method 2100 ends at block 2125.

In the method 2100, one or more of the blocks shown in FIG. 21 may be removed (e.g., not performed) and/or the order in which the method is performed may be switched. For example, in some embodiments, one or more of blocks 2105, 2110, and 2115 may be omitted if the coder determines that the current block includes a raster scan line that does not have any preceding raster scan lines in the same slice (e.g., first line in a slice). In some embodiments, additional blocks may be added to the method 2100. The embodiments of the present disclosure are not limited to or by the example shown in FIG. 21, and other variations may be implemented without departing from the spirit of this disclosure.

Advantages of Using Multiple Search Ranges

The techniques related to using multiple search ranges when coding a block in block prediction mode improves the coding efficiency associated with block prediction mode, thereby increasing the coding performance, especially for graphics-type images and graphics content. Implementing one or more of these techniques may increase the computational complexity at the encoder side. However, encoders typically exhibit a greater degree of tolerance for increased computational complexity, since the encoders are implemented at a smaller process node (20 nm or below). Importantly, the decoder complexity will remain mostly the same even if multiple search ranges are used for coding blocks in block prediction mode. Decoders may typically be implemented at a much larger process size (60 nm and above) and may be subject to stricter hardware requirements (e.g., gate count must minimized). Thus, the techniques of the present disclosure for using multiple search ranges in block prediction mode improve the coding performance with relatively small increases in computational complexity.

Simplified Block Prediction Mode

In some cases, the techniques described above for coding a current block in block prediction mode can be further simplified. For example, for cost-constrained hardware implementations, one or more features described above can be removed or modified to reduce the computational complexity of the coder (at the encoder side, at the decoder side, or both). In such cases, one or more of the following changes can be made to the method of coding a block in block prediction mode without significantly degrading the performance: (i) the coder may use a single search range to predict the current block or partition, instead of using multiple search ranges as described above; (ii) the search range may include pixels from both a previous reconstructed line (e.g., the line that immediately precedes the current line) and the current line, wherein the samples in such lines have already been reconstructed (e.g., by the time the current block or partition is coded); and/or (iii) a single previous reconstructed line is used for predicting the current block or partition, instead of using a previous reconstructed blockline (which may include multiple lines).

Depending on the desired tradeoff of a given implementation between coding performance and hardware complexity, various versions and modifications of the techniques for coding a block in block prediction mode described herein (e.g., standard block prediction mode, block prediction mode using multiple ranges, simplified block prediction mode, etc.) may be used. Some version of block prediction mode may be selected for ADSC depending on the VESA task group's compromise between performance and hardware complexity.

As discussed above, in some embodiments, simplified block prediction mode may use a single search range. In some of such embodiments, the total number of possible block prediction vectors is determined as $2^n$ for some n. For example, ADSC typically uses n=6, in which case the total number of possible block prediction vectors would be 64 positions). The candidate pixels within the search range may come from any of three regions, referred to herein as Region A, Region B, and Region C. An example mapping of BPV indices to search ranges (SR) and positions within the search ranges (SR pos) is illustrated in Table 2. For example, this mapping may be computed from the relative SR lengths $SrLen_i$, $i \in \{A, B, C\}$.

TABLE 2

Mapping from BPV index to SR and pixel position within SR (SR pos).

| BPV | SR | SR pos |
|-----|----|----|
| 0 | A | 0 |
| 25 | A | 25 |
| 26 | B | 0 |
| 33 | B | 7 |
| 34 | C | 0 |
| 64 | C | 29 |

In some embodiments, the block prediction vector which the encoder signals explicitly to the decoder may be an integer in the range $[0, 2^n-1]$. The mapping from an index to a search range may depend on $SrLen_1$. Table 2 illustrates an example in which $SrLen_A=26$, $SrLen_B=8$, $SrLen_C=30$.

Figure 22:
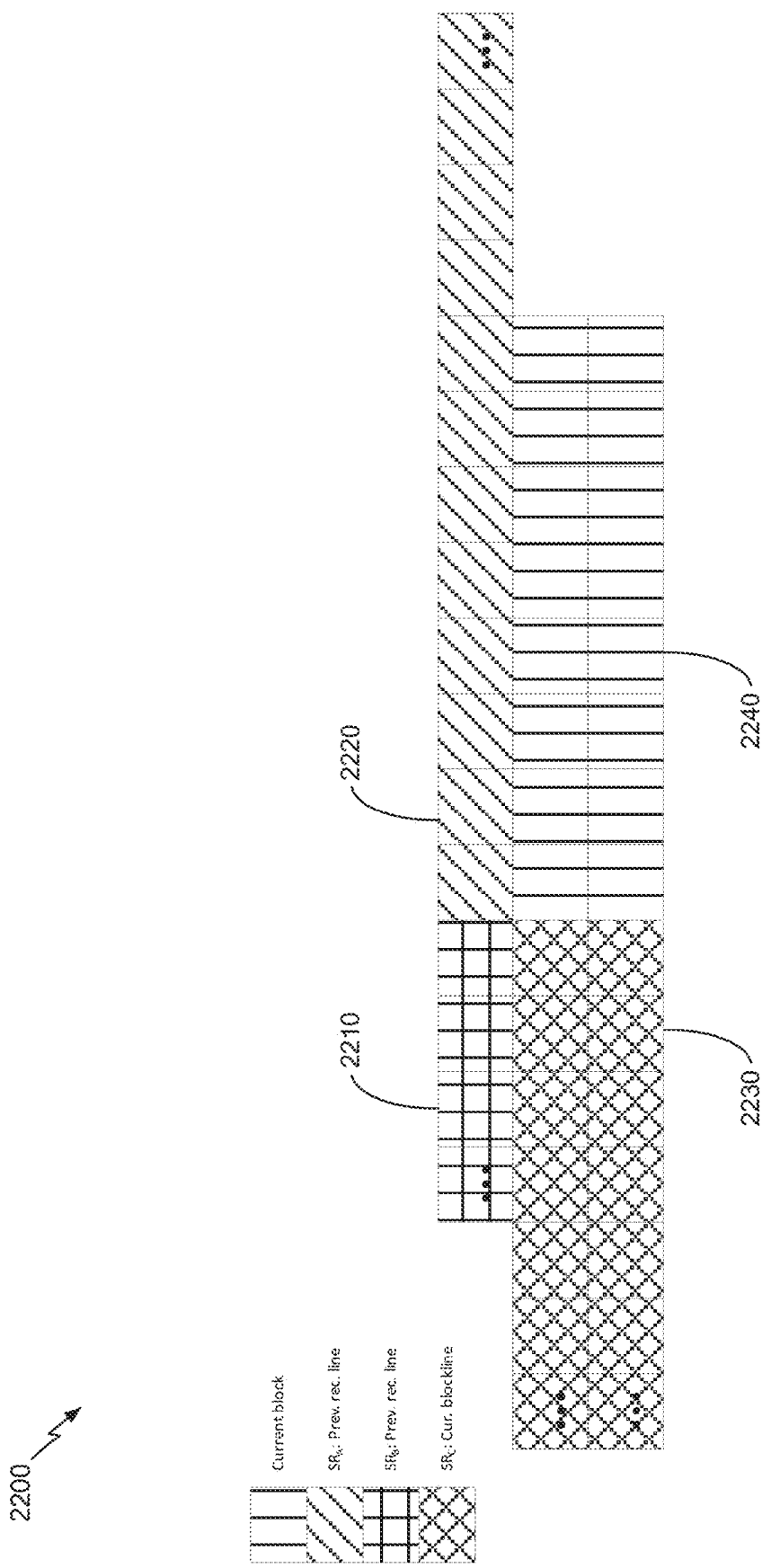
FIG. 22 is a block diagram illustrating example search regions for simplified block prediction mode.

In diagram 2200 of FIG. 22, an example in which simplified block prediction uses a single search range comprising pixels from different regions of the causally-available image (e.g., previously reconstructed pixels) is illustrated. The number of candidates in each particular region can be tuned depending on the parameters of the codec. In the example of FIG. 22, $SR_A/SR_B$ are formed from the previous reconstructed line, while $SR_C$ is formed from the current blockline. For example, $SR_A$ includes pixels that are either directly above (e.g., vertically overlaps with) or to the right of the current block 2340 as illustrated in FIG. 22, and $SR_B$ includes pixels that are to the left of (e.g., not vertically overlapping with the current block 2340 and having a smaller x-coordinate value than pixels in the current block 2340) the current block 2340 as illustrated in FIG. 22. FIG. 22 illustrates $SR_A$ 2220, $SR_B$ 2210, $SR_C$ 2230, and the current block 2240. As illustrated in FIG. 22, $SR_A$ 2220 and $SR_B$ 2210 are in the previous reconstructed line, and the $SR_C$ 2230 is in the current blockline.

Figure 23:
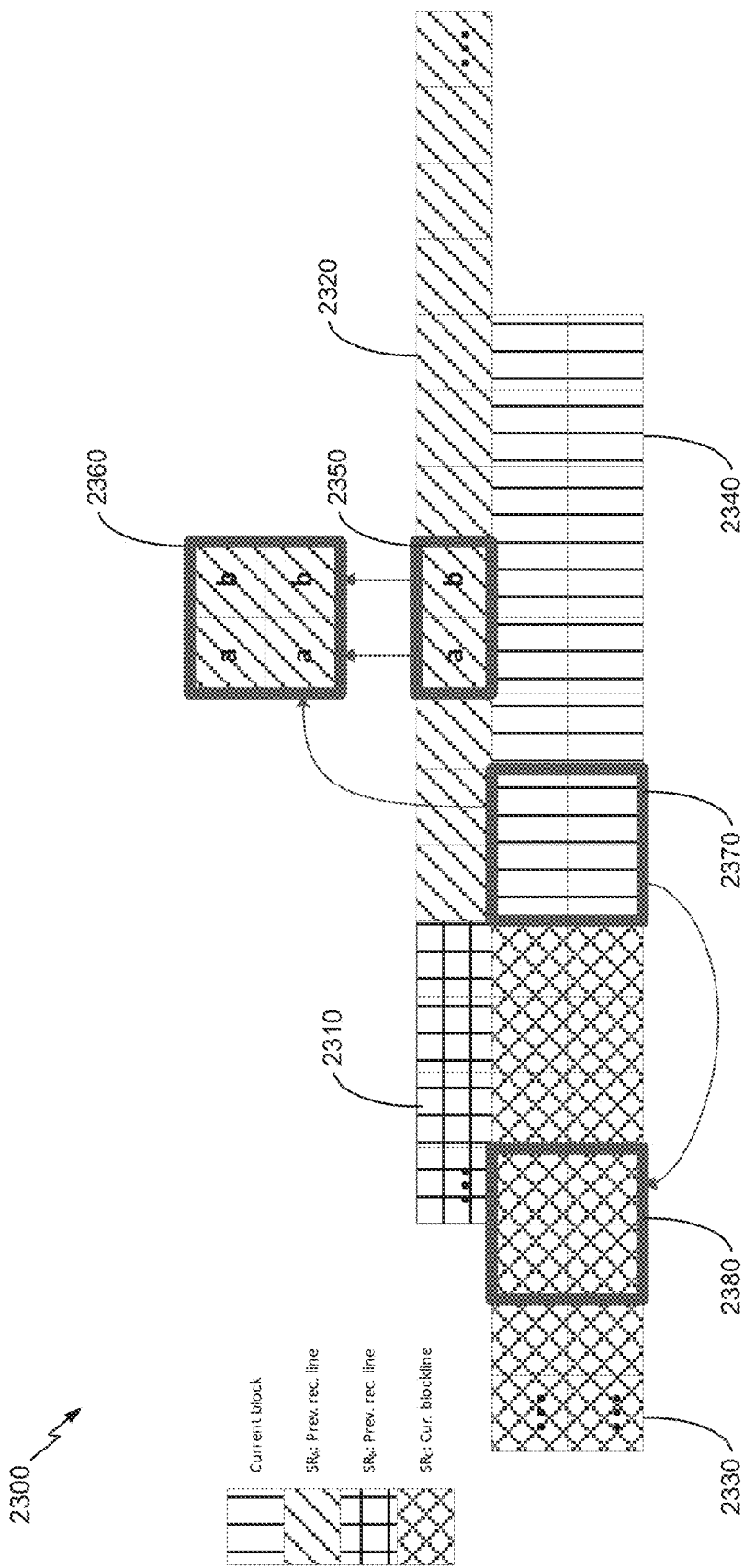
FIG. 23 is a block diagram illustrating example search regions for simplified block prediction mode.

In diagram 2300 of FIG. 23, an example of simplified block prediction mode with variable partition sizing (2×2) is illustrated. Search within $SR_C$ may be performed as described herein (e.g., by determining the cost associated with coding the current block using the 2×2 blocks within $SR_C$). For search within $SR_A/SR_B$, the candidate partition may be extended or padded in the y-direction to create a 2×2 candidate. FIG. 23 illustrates $SR_A$ 2320, $SR_B$ 2310, $SR_C$ 2330, and the current block 2340. In FIG. 23, $SR_A$ 2320 and $SR_B$ 2310 are in the previous reconstructed line, and the $SR_C$ 2330 is in the current blockline.

Figure 24:
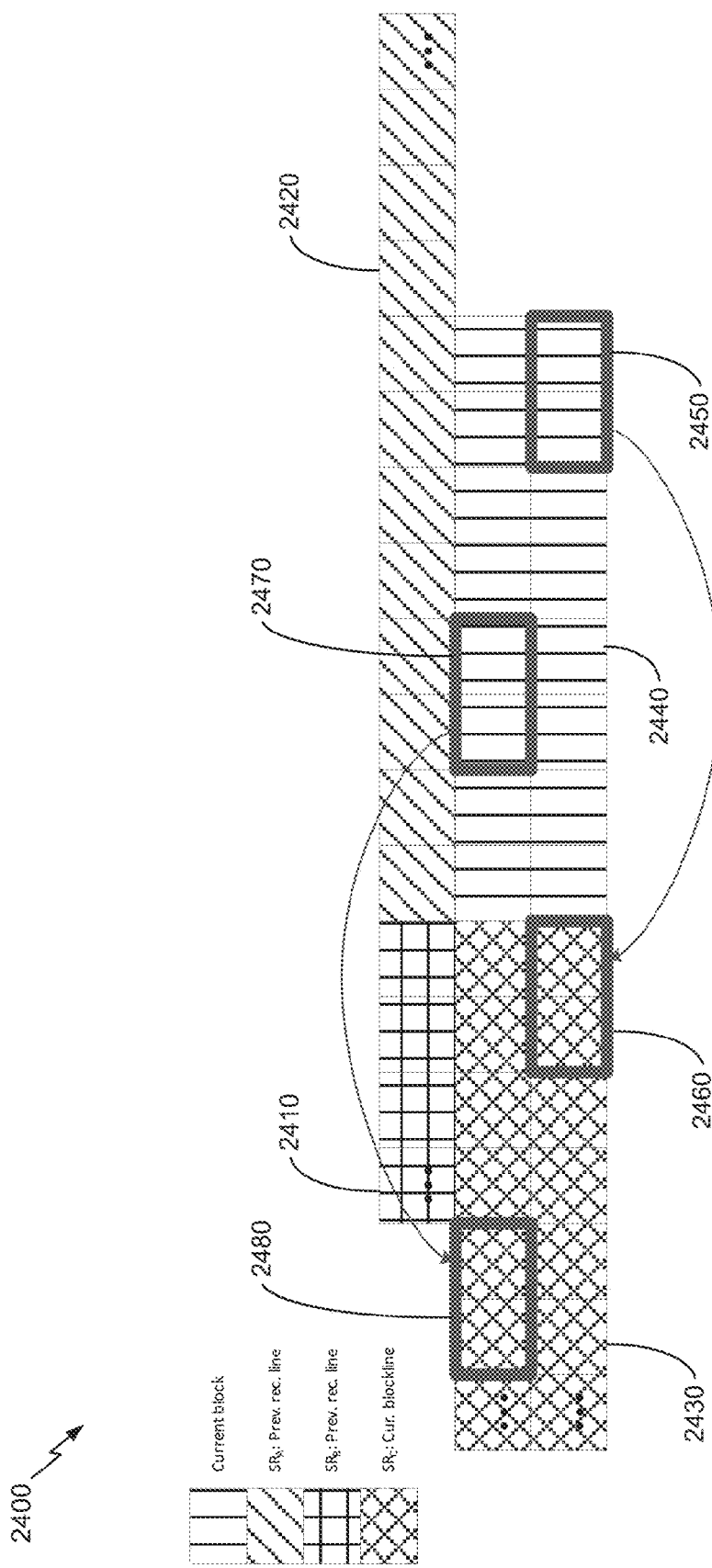
FIG. 24 is a block diagram illustrating example search regions for simplified block prediction mode.

In diagram 2400 of FIG. 24, an example of simplified block prediction mode with variable partition size (1×2) is illustrated. Search within $SR_A/SR_B$ may be performed as described herein (e.g., by determining the cost associated with coding the current block using the 1×2 blocks within $SR_A/SR_B$). For search within $SR_C$ (current blockline), partitions within line 1 of the current block are searched from line 1 of $SR_C$. FIG. 24 illustrates $SR_A$ 2420, $SR_B$ 2410, $SR_C$ 2430, and the current block 2440. In FIG. 24, $SR_A$ 2420 and $SR_B$ 2410 are in the previous reconstructed line, and the $SR_C$ 2430 is in the current blockline.

For example, the number of search positions for a specific region (e.g., Region A, B, or C) may be referred to herein as $SrLen_i$ for region i. In such an example, the following constraint may be established: $SrLen_A+SrLen_B+SrLen_C \leq 2^t$. For example, if block prediction is performed using a single search range, and the maximum number of positions in the single search range is defined to be $2^{11}$, the sum of positions in each of the regions would need to be less than or equal to the maximum number. The values for $SrLen_i$ can be tuned depending on the needs of the codec. In addition, these values can easily be dynamically adjusted based on the location of the current block or partition within the current slice. For example, if the current block or partition is located in the FLS, then the encoder and the decoder may infer that $SR_A$ and $SR_B$ are unavailable to be used for coding the current block. Therefore, a greater number of positions can be allocated to $SR_C$ (e.g., up to the maximum allotted to a single search range).

In addition to, or as an alternative to, using a single search range, in simplified block prediction mode, the requirement for the encoder/decoder to store the previous reconstructed blockline may be removed. Instead, only one previous reconstructed line may be stored. For example, for any block size P×Q, only one reconstructed line may be stored (and included in the search range such as $SR_A$ of FIG. 24) instead of P lines.

If variable partition sizing is to be leveraged, then the following logic changes may be implemented for simplified block prediction mode.

In some implementations, if 2×2 partitions are used for coding the current block, any candidate position from $SR_A/SR_B$ may be extended or padded in the y direction in order to generate a 2×2 candidate, as described above with reference to FIG. 23. For example, as illustrated in FIG. 23, the 1×2 candidate 2350 may be extended or padded in the y direction by duplicating the sample values to generate the 2×2 candidate 2360. A similar technique may be extended to blocks of arbitrary sizes. For example, a candidate may be extended or padded in the y direction to match the height of the current block or partition. On the other hand, the 2×2 candidate 2380 may be used as is without being extended or padded. In other implementations, how a 2×2 partition within the current block is coded may depend which search range (e.g., $SR_A$, $SR_B$, or $SR_C$ in FIGS. 22-24) is used to code the 2×2 partition. Such techniques are described in greater detail below with reference to FIG. 25.

If 1×2 partitions are used for coding the current block, any candidate position from $SR_C$ may be selected from the same line as the current 1×2 partition in the current block, as described above with reference to FIG. 24. For example, as illustrated in FIG. 24, the current partition 2450 is predicted based on the 1×2 candidate 2460 in the same line, and the current partition 2470 is predicted based on the 1×2 candidate 2480 in the same line. In such an example, in order to find a candidate for the current partition 2450, the coder compares the costs of coding the current partition 2450 based on the individual 1×2 blocks in the search range 2430 within the same line as the current partition 2450, and in order to find a candidate for the current partition 2470, the coder compares the costs of coding the current partition 2470 based on the individual 1×2 blocks in the search range 2430 within the same line as the current partition 2470.

Advantages of Coding in Simplified Block Prediction Mode

The techniques related to coding in simplified block prediction mode offers a trade-off between performance and complexity, both at the encoder side and at the decoder side. This may be desirable for any implementation which is constrained in hardware cost.

Further Simplifying the Simplified Block Prediction Mode

In order to reduce the area of an ADSC implementation for ASIC/FPGA, a further modification may be made to the search ranges used in simplified block prediction mode described above. The hardware implementation of an ADSC decoder may require fast random access to all positions within the search range. For example, such a hardware implementation may include an array of flip-flops proportional to the size of the search range (e.g., in the worst case). Thus, limiting the maximum number of possible positions within each portion of the search range (e.g., size of regions within the search range) may be desirable. In one example, a maximum number of possible positions within each region within the search range may be as follows: $SR_A=20$, $SR_B=12$, $SR_C=32$. For example, the number of positions in the respective regions may be restricted to such maximum numbers regardless of how many positions are in the other regions. If the current block being processed is at position x=128 (e.g., with 128 pixels in front of the current block within the same line) within the first line of a slice, then the number of positions for search range C would be restricted to 32 despite the fact that search ranges A and B have no pixels available for coding the current block and that additional pixels may be included in search range C without exceeding the maximum size of the search range (e.g., 64 of the 128 previously coded pixels may be included in the search range if the maximum size of the search range is 64 pixels). Such a restriction may be placed in order to limit the amount of storage required in hardware, at the expense of coding efficiency. From the encoder standpoint, the other 32 search range positions (e.g., the first 20 pixels and the last 12 pixels of the 64-position search range) may be "invalid" for any current block within the first line of a slice. In some implementations, the respective portions of the search range may always be assigned the same number of positions, and each position may be "valid" or "invalid" depending on whether the pixel at the position exists or is available to the encoder at the time of coding the current block. Block prediction search and all other operations (e.g., cost calculation and comparison) may be skipped for such invalid positions. The number of valid positions will increase towards the right edge of the first line of a slice (e.g., as illustrated by the second row of FIG. 25, where search range 2520 extends into the following blockline). In other implementations, the sum of the number of positions in the respective portions of the search range may be restricted to be less than or equal to a maximum number (e.g. 64 positions). In such implementations, if the current block being processed is at position x=128 (e.g., with 128 pixels in front of the current block within the same line) within the first line of a slice, then the number of positions for search range C may be equal to a number greater than 32 (e.g., up to 64, if the maximum number is 64), since the other search ranges (e.g., A and B) would be empty.

To limit the impact on coding efficiency, in certain circumstances, a fewer number of bits may be used to signal the block prediction vectors in the bitstream. For example, if the current block is within a certain range of positions (e.g., first line of a slice), both the encoder and the decoder may infer that a fewer number of bits are used to signal the block prediction vectors and correctly identify the candidate block or partition using the block prediction vectors that are signaled using less than the number of bits needed to correctly identify each of the individual positions in the search range (e.g., 6 bits if the search range has 64 positions). In the above example in which 32 of the 64 positions are determined to be "invalid," 5 bits per block prediction vector can be used during the majority of the first line of a slice instead of 6, since only 32 of the 64 search range positions are valid during that time.

In addition, the ability to fill the search range flip-flops at a constant rate relative to the block timing may be advantageous for the hardware implementation of ADSC. This means that the search range should effectively shift at one block-width per block time. As a result, certain positions within search range C may technically be in the previous blockline with respect to the current block once the current block advances to the next line of the slice. An illustration of this feature is shown in diagram 2500 of FIG. 25. As the current block 2510 moves towards the slice right edge and then to the next blockline, the search range 2530 (e.g., portion of the search range in the current blockline) remains in the previous blockline, as shown in the fourth and fifth rows of FIG. 25.

Figure 25:
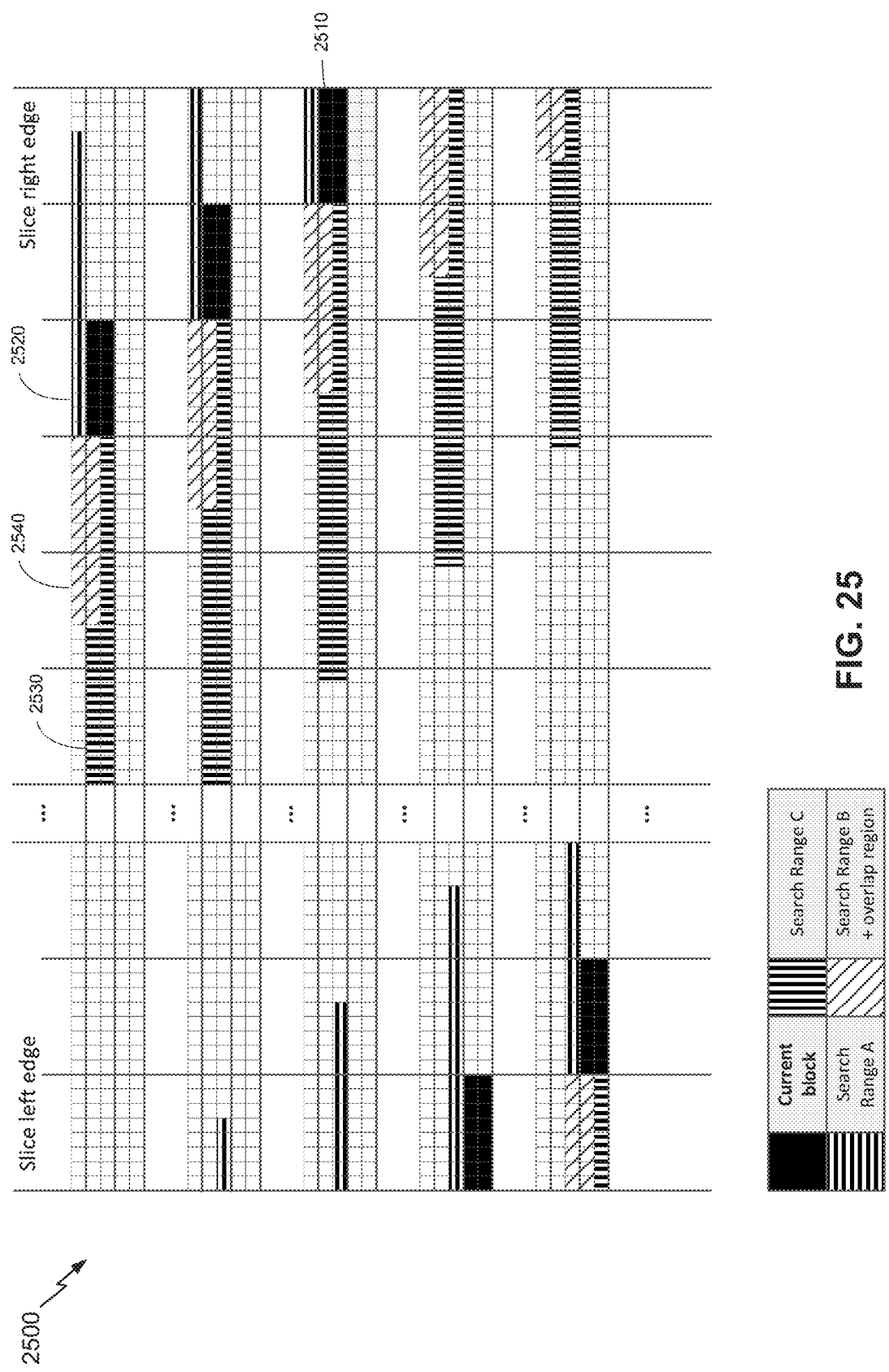
FIG. 25 is a block diagram illustrating example search regions for simplified block prediction mode.

In some embodiments, search range B (e.g., top line of search range 2540 of FIG. 25) may be used to generate 2×2 prediction candidates that span the previous line and the first line of the current blockline. As shown in FIG. 25, the top line of search range 2540 is search range B, and the bottom line of search range 2540 is a portion of search range C (e.g., search range 2530) that is co-located with respect to search range B. Thus, in some of such embodiments, instead of extending or padding a 1×2 prediction candidate in search range B to generate a 2×2 prediction candidate, the coder may utilize 2×2 prediction candidates that include two pixels from the previous reconstructed line (e.g., two pixels from search range B) and two pixels from the first line of the current blockline (e.g., two pixels from search range C, co-located with respect to the two pixels in search range B). This approach cannot be used for search range A (e.g., search range 2520) since the pixels from the current blockline co-located with respect to the pixels in search range A (e.g., immediately below the pixels in search range A) are not causally available at the time of coding the current block 2510.

Coding in Block Prediction Mode Using Simplified Search Range

Figure 26:
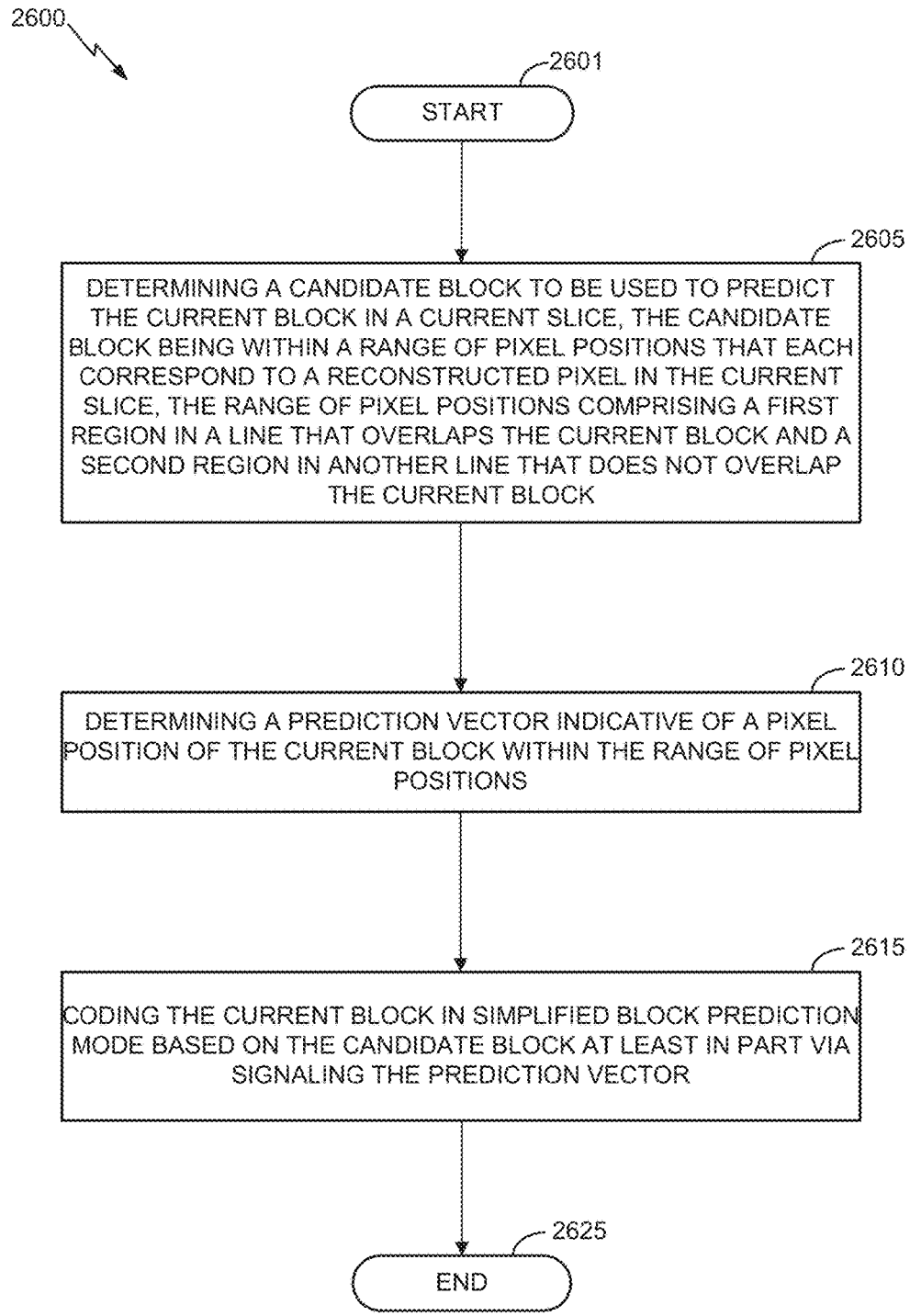
FIG. 26 is a flowchart illustrating a method for predicting a block of video data in simplified block prediction mode.

With reference to FIG. 26, an example procedure for coding a block of video data in block prediction mode will be described. The steps illustrated in FIG. 26 may be performed by a video encoder (e.g., the video encoder 20 in FIG. 2A) or component(s) thereof. For convenience, method 2600 is described as performed by a coder, which may be the video encoder 20 or another component.

The method 2600 begins at block 2601. At block 2605, the coder determines a candidate block to be used to predict a current block in a current slice, where the candidate block being within a range of pixel positions (e.g., search range) that each correspond to a reconstructed pixel in the current slice. For example, the coder determines a cost associated with coding the current block based on each potential candidate block of a plurality of potential candidate blocks in the range of pixel positions, and identifies one of the blocks having the lowest cost as the candidate block. Each potential candidate block may correspond to one of the pixel positions in the range of pixel positions. The range of pixel positions may include a first region including one or more first pixel positions in a first line of pixels in the current slice, where the first line of pixels overlaps the current block. For example, the first line of pixels may span an entire width of the current slice, and the first line of pixels may include at least one pixel in the current block. Further, the range of pixel positions may include a second region including one or more second pixel positions in a second line of pixels in the current slice, where the second line of pixels does not overlap the current block. For example, the second line of pixels may span the entire width of the current slice and not include any pixel in the current block. The second line of pixels may immediately precede the first line in the current slice. Each of the first and second lines may be a raster scan line within the current slice. In some embodiments, the first region and the second region occupy different raster scan lines. The first region may be in a raster scan line that overlaps the current block (e.g., where the raster scan line and the current block include at least one common pixel). The range of pixel positions may further include a third region including one or more third pixel positions in the second line (e.g., in the same line that includes the second region). For example, none of the one or more third pixel positions in the third region may include any pixel position in the second line that is co-located with respect to a pixel position in the first line that is part of the current block (or vertically overlap the current block), whereas at least one of the one or more second pixel positions in the second region may include one or more pixel positions in the second line that is co-located with respect to a pixel position in the first line that is part of the current block (or vertically overlaps the current block). As discussed herein, the regions may each include a different number of pixel positions. For example, the number of pixel positions in the first region may be greater than the number of pixel positions in the second region, which has a greater number of pixel positions than the third region. In some embodiments, the current block is a 1×2 partition within a 2×8 block predicted in simplified block prediction mode. In other embodiments, the current block is a 2×2 partition within a 2×8 block predicted in simplified block prediction mode. In some other embodiments, the current block is a 2z8 block predicted in simplified block prediction mode. Each potential candidate block in the range of pixel positions may correspond to (e.g., include as the top-left pixel or another reference pixel) any pixel position in the range of pixel positions (e.g., pixel positions in the first region, second region, or third region). The video data associated with the candidate block may be stored in a memory of a video encoding device.

At block 2610, the coder determines a prediction vector indicative of a pixel position of the candidate block within the range of pixel positions. For example, the pixel position of the candidate block may be in one of the first region or the second region.

At block 2615, the coder codes the current block in simplified block prediction mode at least in part via signaling the prediction vector. The coder may signal the prediction vector using a fixed number of bits (e.g., minimum number of bits needed to uniquely identify each pixel position in the range of pixel positions). For example, if there are 64 pixel positions in the range of pixel positions, 6 bits may be used for signaling each prediction vector. In some embodiments, if the location of the current block within the current slice prevents the range of pixel positions from having more than a certain number of pixel positions less than the maximum number of pixel positions, the coder may signal the prediction vector using less than the number of bits needed to uniquely identify the maximum number of pixel positions in the range of pixel positions. For example, if the coder determines that the range of pixel locations cannot have more than 32 pixel positions due to the location of the current block within the current slice (e.g., the current line is the first line in the current slice and there are only 32 reconstructed pixels that precede the current block in raster scan order), a reduced number of bits (e.g., 5 in this case) may be used to signal the prediction vector indicative of the pixel position of the candidate block to be used to code the current block. The method 2600 ends at block 2620.

In the method 2600, one or more of the blocks shown in FIG. 26 may be removed (e.g., not performed) and/or the order in which the method is performed may be switched. In some embodiments, additional blocks may be added to the method 2600. For example, in some embodiments, the coder may determine that that the current block includes at least one pixel in the first line of pixels and at least one pixel in a third line of pixels in the current slice, where the third line of pixels spans the entire width of the current slice and includes at least one pixel in the current block, and where the third line is different from the first line. Based on such a determination, the coder may (i) determine a cost associated with coding the current block based on a first block, where the first block includes at least one pixel in the first region and at least one pixel in the second region, and (ii) based on the cost associated with coding the current block based on the first block, determine the first block to be the candidate block to be used to predict the current block. In another embodiment, the coder may determine that that the current block includes at least one pixel in the first line of pixels and at least one pixel in a third line of pixels in the current slice, where the third line of pixels spans the entire width of the current slice and includes at least one pixel in the current block, and where the third line is different from the first line. Based on such a determination, the coder may (i) determine a first cost associated with coding the current block based on a first block having a fewer number of pixels than the current block, where the first block includes one or more pixels that are each in the second region, (ii) determine a second cost associated with coding the current block based on a second block having the same number of pixels as the current block, where the second block includes all of the one or more pixels in the first block and one or more additional pixels that are each in the first region, and (iii) based on a determination that the second cost is greater than the first cost, determine the first block to be the candidate block to be used to predict the current block. The embodiments of the present disclosure are not limited to or by the example shown in FIG. 26, and other variations may be implemented without departing from the spirit of this disclosure.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for coding a block of video data in simplified block prediction mode of a constant bitrate video coding scheme, the method comprising:
    determining a candidate block to be used to predict a current block in a current slice, the candidate block being within a range of pixel positions that each correspond to a reconstructed pixel in the current slice, the range of pixel positions comprising at least (i) a first region including one or more first pixel positions in a first line of pixels in the current slice, the first line of pixels including at least one pixel in the current block and spanning an entire width of the current slice, and (ii) a second region including one or more second pixel positions in a second line of pixels in the current slice, the second line of pixels not including any pixel in the current block but spanning the entire width of the current slice;
    determining a cost associated with coding the current block based on each potential candidate block of a plurality of potential candidate blocks, the plurality of potential candidate blocks each corresponding to one of the first and second pixel positions in the first and second regions;
    identifying one of the plurality of potential candidate blocks in the first and second regions having a lowest cost as the candidate block;
    determining a prediction vector indicative of a pixel position of the candidate block within the range of pixel positions, the pixel position of the candidate block being in one of the first region or the second region; and coding the current block in simplified block prediction mode at least in part via signaling the prediction vector.

2. The method of claim 1, wherein the first line of pixels and the second line of pixels comprise two adjacent raster scan lines of the current slice.

3. The method of claim 1, wherein the current block is a 1×2 partition within a 2×8 block predicted in simplified block prediction mode.

4. The method of claim 1, wherein the current block is a 2×2 partition within a 2×8 block predicted in simplified block prediction mode.

5. The method of claim 1, wherein the range of pixel positions further includes a third region comprising one or more third pixel positions in the second line of pixels, wherein the one or more third pixel positions do not include any pixel position in the second line that is co-located with respect to a pixel position in the first line that is part of the current block.

6. The method of claim 5, wherein the second region and the third region occupy the same raster scan line.

7. The method of claim 5, wherein the first region includes a first number of pixel positions, the second region includes a second number of pixel positions, and the third region includes a third number of pixel positions, wherein the first number is greater than the second number and greater than the third number.

8. The method of claim 7, wherein the first, second, and third numbers are different from each other.

9. The method of claim 1, wherein a number of bits needed to uniquely identify each pixel position in the range of pixel positions is equal to a first number, the method further comprising:
   determining that the current block is within a predetermined region within the current slice; and
   signaling the prediction vector using less than the first number of bits.

10. The method of claim 1, further comprising:
   determining that the current block includes at least one pixel in the first line of pixels and at least one pixel in a third line of pixels in the current slice, the third line of pixels including at least one pixel in the current block and spanning the entire width of the current slice, wherein the third line is different from the first line;
   determining a cost associated with coding the current block based on a first block, the first block including at least one pixel in the first region and at least one pixel in the second region; and
   determining, based on the cost associated with coding the current block based on the first block, the first block to be the candidate block to be used to predict the current block.

11. The method of claim 1, further comprising:
   determining that the current block includes at least one pixel in the first line of pixels and at least one pixel in a third line of pixels in the current slice, the third line of pixels including at least one pixel in the current block and spanning the entire width of the current slice, wherein the third line is different from the first line;
   determining a first cost associated with coding the current block based on a first block having a fewer number of pixels than the current block, the first block including one or more pixels that are each in the second region;
   determining a second cost associated with coding the current block based on a second block having the same number of pixels as the current block, the second block including all of the one or more pixels in the first block and one or more additional pixels that are each in the first region; and
   determining, based on a determination that the second cost is greater than the first cost, the first block to be the candidate block to be used to predict the current block.

12. An apparatus for coding a block of video data in simplified block prediction mode of a constant bitrate video coding scheme, the apparatus comprising:
   a memory configured to store one or more reconstructed pixels of a current slice of video data; and
   one or more processors in communication with the memory and configured to:
      determine a candidate block to be used to predict a current block in the current slice, the candidate block being within a range of pixel positions that each correspond to a reconstructed pixel in the current slice, the range of pixel positions comprising at least (i) a first region including one or more first pixel positions in a first line of pixels in the current slice, the first line of pixels including at least one pixel in the current block and spanning an entire width of the current slice, and (ii) a second region including one or more second pixel positions in a second line of pixels in the current slice, the second line of pixels not including any pixel in the current block but spanning the entire width of the current slice;
      determine that the current block includes at least one pixel in the first line of pixels and at least one pixel in a third line of pixels in the current slice, the third line of pixels including at least one pixel in the current block and spanning the entire width of the current slice, wherein the third line is different from the first line;
      determine a cost associated with coding the current block based on a first block, the first block including at least one pixel in the first region and at least one pixel in the second region;
      determine, based on the cost associated with coding the current block based on the first block, the first block to be the candidate block to be used to predict the current block;
      determine a prediction vector indicative of a pixel position of the candidate block within the range of pixel positions, the pixel position of the candidate block being in one of the first region or the second region; and
      code the current block in simplified block prediction mode at least in part via signaling the prediction vector.

13. The apparatus of claim 12, wherein the first line of pixels and the second line of pixels comprise two adjacent raster scan lines of the current slice.

14. The apparatus of claim 12, wherein the current block is a 1×2 partition within a 2×8 block predicted in simplified block prediction mode.

15. The apparatus of claim 12, wherein the current block is a 2×2 partition within a 2×8 block predicted in simplified block prediction mode.

16. The apparatus of claim 12, wherein the range of pixel positions further includes a third region comprising one or more third pixel positions in the second line of pixels, wherein the one or more third pixel positions do not include any pixel position in the second line that is co-located with respect to a pixel position in the first line that is part of the current block.

17. The apparatus of claim 16, wherein the second region and the third region occupy the same raster scan line.

18. The apparatus of claim 16, wherein the first region includes a first number of pixel positions, the second region includes a second number of pixel positions, and the third region includes a third number of pixel positions, wherein the first number is greater than the second number and greater than the third number.

19. The apparatus of claim 18, wherein the first, second, and third numbers are different from each other.

20. The apparatus of claim 12, wherein the one or more processors are further configured to:
    determine a cost associated with coding the current block based on each potential candidate block of a plurality of potential candidate blocks, the plurality of potential candidate blocks each corresponding to one of the first and second pixel positions in the first and second regions; and
    identify one of the plurality of potential candidate blocks in the first and second regions having a lowest cost as the candidate block.

21. The apparatus of claim 12, wherein a number of bits needed to uniquely identify each pixel position in the range of pixel positions is equal to a first number, the one or more processors further configured to:
    determine that the current block is within a predetermined region within the current slice; and
    signal the prediction vector using less than the first number of bits.

22. The apparatus of claim 12, wherein the one or more processors are further configured to:
    determine that the current block includes at least one pixel in the first line of pixels and at least one pixel in a third line of pixels in the current slice, the third line of pixels including at least one pixel in the current block and spanning the entire width of the current slice, wherein the third line is different from the first line;
    determine a first cost associated with coding the current block based on a first block having a fewer number of pixels than the current block, the first block including one or more pixels that are each in the second region;
    determine a second cost associated with coding the current block based on a second block having the same number of pixels as the current block, the second block including all of the one or more pixels in the first block and one or more additional pixels that are each in the first region; and
    determine, based on a determination that the second cost is greater than the first cost, the first block to be the candidate block to be used to predict the current block.

23. Non-transitory physical computer storage comprising code configured to code a block of video data in simplified block prediction mode of a constant bitrate video coding scheme, wherein the code, when executed, causes an apparatus to:
    determine a candidate block to be used to predict a current block in a current slice, the candidate block being within a range of pixel positions that each correspond to a reconstructed pixel in the current slice, the range of pixel positions comprising at least (i) a first region including one or more first pixel positions in a first line of pixels in the current slice, the first line of pixels including at least one pixel in the current block and spanning an entire width of the current slice, and (ii) a second region including one or more second pixel positions in a second line of pixels in the current slice, the second line of pixels not including any pixel in the current block but spanning the entire width of the current slice;
    determine that the current block includes at least one pixel in the first line of pixels and at least one pixel in a third line of pixels in the current slice, the third line of pixels including at least one pixel in the current block and spanning the entire width of the current slice, wherein the third line is different from the first line;
    determine a cost associated with coding the current block based on a first block, the first block including at least one pixel in the first region and at least one pixel in the second region;
    determine, based on the cost associated with coding the current block based on the first block, the first block to be the candidate block to be used to predict the current block;
    determine a prediction vector indicative of a pixel position of the candidate block within the range of pixel positions, the pixel position of the candidate block being in one of the first region or the second region; and
    code the current block in simplified block prediction mode at least in part via signaling the prediction vector.

24. The non-transitory physical computer storage of claim 23, wherein the range of pixel positions further includes a third region comprising one or more third pixel positions in the second line of pixels, wherein the one or more third pixel positions do not include any pixel position in the second line that is co-located with respect to a pixel position in the first line that is part of the current block.

25. The non-transitory physical computer storage of claim 24, wherein the first region includes a first number of pixel positions, the second region includes a second number of pixel positions, and the third region includes a third number of pixel positions, wherein the first number is greater than the second number and greater than the third number.

26. A video coding device configured to code a block of video data in simplified block prediction mode of a constant bitrate video coding scheme, the video coding device comprising:
    determine a candidate block to be used to predict a current block in a current slice, the candidate block being within a range of pixel positions that each correspond to a reconstructed pixel in the current slice, the range of pixel positions comprising at least (i) a first region including one or more first pixel positions in a first line of pixels in the current slice, the first line of pixels including at least one pixel in the current block and spanning an entire width of the current slice, and (ii) a second region including one or more second pixel positions in a second line of pixels in the current slice, the second line of pixels not including any pixel in the current block but spanning the entire width of the current slice;
    determine a cost associated with coding the current block based on each potential candidate block of a plurality of potential candidate blocks, the plurality of potential candidate blocks each corresponding to one of the first and second pixel positions in the first and second regions;
    identify one of the plurality of potential candidate blocks in the first and second regions having a lowest cost as the candidate block;
    determine a prediction vector indicative of a pixel position of the candidate block within the range of pixel positions, the pixel position of the candidate block being in one of the first region or the second region; and code the current block in simplified block prediction mode at least in part via signaling the prediction vector.

27. The video coding device of claim 26, wherein the range of pixel positions further includes a third region comprising one or more third pixel positions in the second line of pixels, wherein the one or more third pixel positions do not include any pixel position in the second line that is co-located with respect to a pixel position in the first line that is part of the current block.

28. The video coding device of claim 27, wherein the first region includes a first number of pixel positions, the second region includes a second number of pixel positions, and the third region includes a third number of pixel positions, wherein the first number is greater than the second number and greater than the third number.

* * * * *